US010064062B2

(12) United States Patent
Idnani et al.

(10) Patent No.: US 10,064,062 B2
(45) Date of Patent: Aug. 28, 2018

(54) SYSTEM AND METHOD FOR AUTOMATICALLY AND SECURELY REGISTERING AN INTERNET OF THINGS DEVICE

(71) Applicant: Sears Brands, L.L.C., Hoffman Estates, IL (US)

(72) Inventors: Ajaykumar R. Idnani, Hoffman Estates, IL (US); Angel Fernando Favila, Lake In The Hills, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 108 days.

(21) Appl. No.: 15/175,740

(22) Filed: Jun. 7, 2016

(65) Prior Publication Data

US 2017/0353859 A1    Dec. 7, 2017

(51) Int. Cl.
| | |
|---|---|
| *H04W 60/00* | (2009.01) |
| *H04W 48/16* | (2009.01) |
| *H04W 88/16* | (2009.01) |
| *H04W 12/08* | (2009.01) |

(52) U.S. Cl.
CPC .......... *H04W 12/08* (2013.01); *H04W 48/16* (2013.01); *H04W 60/00* (2013.01); *H04W 88/16* (2013.01)

(58) Field of Classification Search
CPC . H04M 3/42059; H04M 3/4365; H04L 51/24; H04L 67/306; H04W 4/16; H04W 8/183
See application file for complete search history.

(56) References Cited

U.S. PATENT DOCUMENTS

| | | | | |
|---|---|---|---|---|
| 9,485,231 | B1 * | 11/2016 | Reese | ............ H04L 63/02 |
| 2013/0152167 | A1 * | 6/2013 | Park | ............ H04W 12/00 726/3 |
| 2016/0055469 | A1 * | 2/2016 | Kim | ............ H04L 41/12 705/21 |

* cited by examiner

*Primary Examiner* — Marisol Figueroa
(74) *Attorney, Agent, or Firm* — McAndrews, Held & Malloy, Ltd.

(57) ABSTRACT

A mechanism for automatically registering Internet-of-Things (IoT) devices to an end-user account of an Internet-based resource, using a gateway that the end-user previously registered to the account. Various security alternatives are described that help avoid masquerading and other attacks on the home network of the end-user.

24 Claims, 16 Drawing Sheets

SYSTEM AND METHOD FOR AUTOMATICALLY AND SECURELY REGISTERING AN INTERNET OF THINGS DEVICE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

In an Internet of Things (IoT) deployment, an end-user typically manually adds new IoT devices to an end-user account with a service provider. The manual process of adding each device to an end-user account consists of a number of steps that are repeated for each IoT device and are prone to human errors, which frequently results in the device(s) not being properly registered to the owner (i.e., end-user) of the device(s). In addition, a manual mechanism of adding such devices becomes cumbersome, if the end-user wants to add multiple different IoT devices to their account.

Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
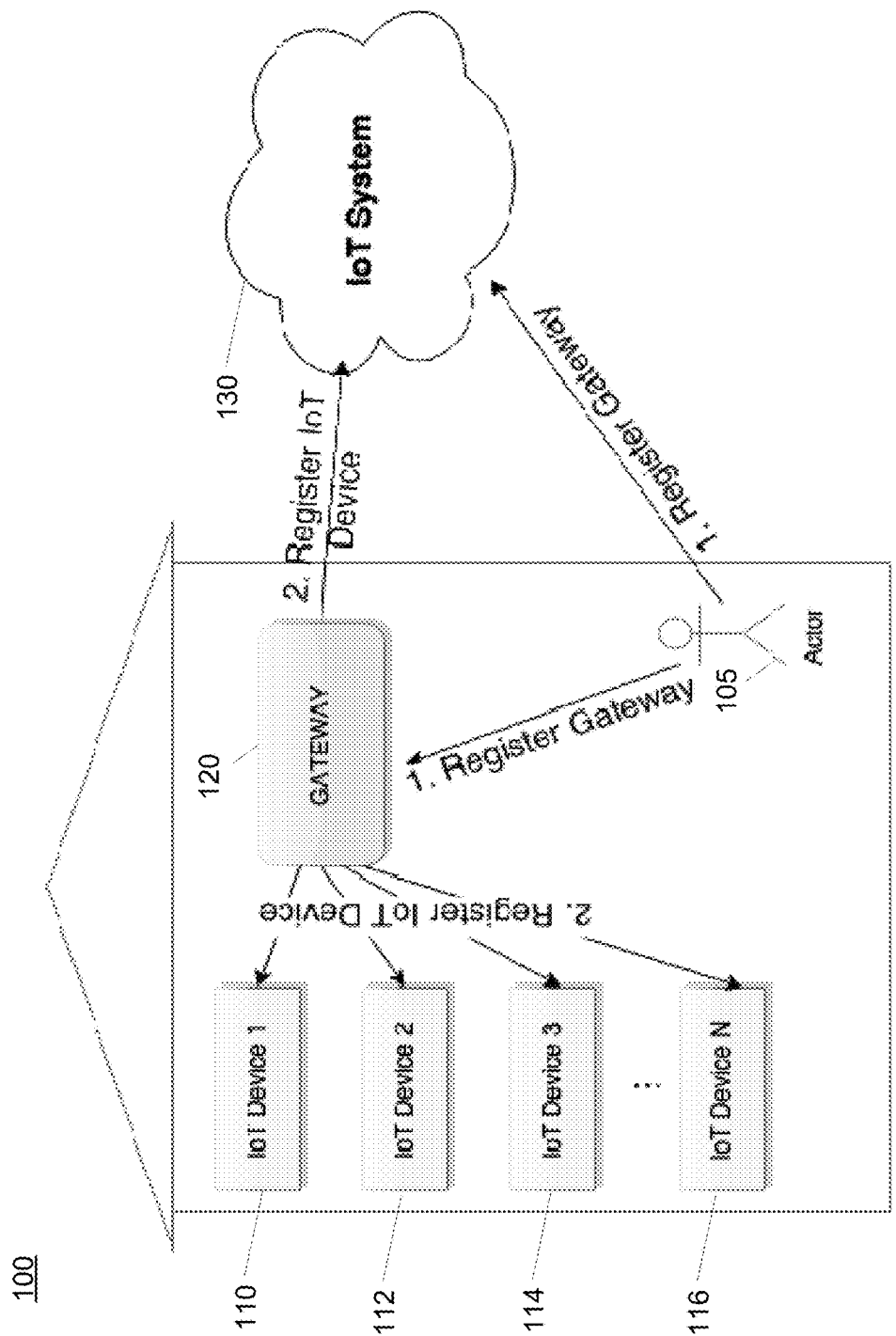
FIG. 1 is a block diagram illustrating the elements of an example network, in accordance with various aspects of the present disclosure.

Various aspects of the present disclosure provide a method and system for automatically and securely registering or associating an Internet of Things (IoT) device with a user account on a remote IoT system.

DETAILED DESCRIPTION OF VARIOUS ASPECTS OF THE DISCLOSURE

The present application relates to the connection of user devices to remote system via the Internet. More specifically, the present application relates to a method and system for automatically and securely registering or associating an Internet of Things (IoT) device with a user account on a remote IoT system. The term "Internet of Things" and the abbreviation "IoT" may be used herein to refer to the network of physical objects—devices, vehicles, buildings, and other items—embedded with electronics, software, sensors, and network connectivity that enables these objects to collect and exchange data. The IoT allows objects to be sensed and controlled remotely across existing network infrastructure, creating opportunities for more direct integration of the physical world into computer-based systems.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

Various aspects of the present disclosure address problems that may be experienced by end-users attempting to make use of IoT devices, by introducing a gateway device that the end-user registers on one or more end-user account(s) on IoT systems that monitor and/or control the IoT devices of the end-user. The gateway device may continuously scan for IoT devices in close proximity to the gateway device, and may act as a proxy on the end-user's behalf to automatically register the IoT devices of the end-user with the account(s) of the end-user. The process of automatic registration of IoT devices with the gateway device present a number of challenges, which will be addressed below. It should be noted that while the term "house" may be used herein, the use of that term does not represent a specific limitation of the present disclosure, as the inventive concepts discussed herein are applicable to other locations as well, without departing from the scope of the present disclosure.

FIG. 1 is a block diagram illustrating the elements of an example network 100, in accordance with various aspects of the present disclosure. The illustration of FIG. 1 shows a number of IoT devices 110, 112, 114, 116 connected via respective wired or wireless communication paths to a gateway device 120. Possible wired and/or wireless interfaces include, by way of example and not limitation, Ethernet, IEEE 802.11 a/b/g/n/ac, Bluetooth, Zigbee, and/or IEEE 802.15. The gateway device 120 is shown connected via a wired or wireless communication network such as, for example, the Internet, to an IoT system 130 having end-user accounts for controlling, monitoring, or managing IoT devices registered or associated with the end-user accounts. In accordance with various aspects of the present disclosure, the gateway device 120 illustrated in FIG. 1 may, for example, be a specialized IoT hub that all IoT devices attach to using one or more of a variety of different communication mechanisms (e.g., Wi-Fi, Zigbee, Bluetooth, Ethernet, etc). The gateway device may alternatively be a specialized Wi-Fi router that may also support other wireless and/or wired technologies such as, for example, Zigbee, Bluetooth, Ethernet, etc. The IoT devices 110, 112, 114, 116 may be, for example, any suitable piece of equipment, appliance, interface, sensor, or any other device equipped with suitable communication interfaces and software, circuitry, and/or logic that enable communication with the gateway device 120 via its respective communication path. Additional details about the gateway device 120 are provided below with respect to FIG. 2. The term "IoT System" may be used herein to refer to a set of servers on the Internet that maintain an association between the user and one or more IoT devices, and that in general allows the user to monitor and control their IoT devices such as, for example, the IoT system 130 of FIG. 1.

In accordance with various aspects of the present disclosure, a process for registering or associating IoT devices with remote systems may begin with a user manually registering a gateway device (e.g., gateway device 120). Once registered, the gateway device may then register IoT devices in close vicinity to the gateway device with an account of the end-user. The gateway device may continuously or periodically scan for Wi-Fi APs sending a particular beacon transmission with a known SSID format or pattern (e.g., IoT_1234). An IoT device in accordance with the present disclosure may transmit the particular beacon using what is referred to herein as a "Wi-Fi Soft AP." When the gateway device finds such an AP beacon, the gateway device may then connect to the IoT device (i.e., the WiFi SoftAP) as a Wi-Fi station (STA), and may provide the credentials of the Wi-Fi network of the end-users to the IoT device. The IoT device may then use the end-user WiFi network to connect to the Internet and through the Internet to the IoT system of a service provider. The gateway device may disconnect from the IoT device (i.e., the WiFi SoftAP) and connect to the IoT system of the service provider, to claim the IoT device on behalf of the end-user, and to add the IoT device to the account of the end user. In accordance with aspects of the present disclosure, the gateway device may have an existing connection with the IoT system of the service provider, by virtue of being registered to the service provider. The process above may appear simple, however, there are multiple challenges presented by the process that will be addressed in the discussion that follows.

If an end-user is located in a dwelling with multiple homes where neighbors have IoT devices of their own, it is possible that the gateway device of a first neighbor may "see" (i.e., detect) and scan the IoT devices of a second neighbor. Similarly, it is also possible that the gateway device of the second neighbor may be able to "see" and scan the IoT devices of the first neighbor. In such a situation, the IoT devices of the neighbors could potentially end up being registered to or associated with the incorrect end-user. To remedy this situation, the IoT devices of a system according to aspects of the present disclosure may present the signal strength and Service Set Identifier (SSID) of each access point (AP) that the IoT device it is able to see, to the gateway device. The gateway device (e.g., via the "Soft AP" of the IoT device) may provide the credentials of the Wi-Fi AP of the end-user to the IoT device only if the SSID of the gateway device has the greatest strength as seen by the IoT device. In spite of the above mechanism, there may still be cases where an IoT device receives a signal of greater strength from a neighbor's gateway device than from the IoT device owner's gateway device. In accordance with various aspects of the present disclosure, the gateway device may optionally seek user consent before adding a new IoT device to an end-user account. The end-user may be permitted to disable the requirement for end-user consent through a configuration setting of the gateway device. That is, in a situation where the end-user resides in a single-family home away from their neighbors, the end-user may depend on the mechanism described above, and may disable the requirement for end-user consent. However, in a situation where an end-user resides in an apartment where nearby neighbors also have IoT devices and gateway devices, the end-user may choose to enable the end-user consent option, to avoid having their gateway device scan and claim the IoT devices of nearby end-users.

A system in accordance with various aspects of the present disclosure may include various means to address situations where a malicious end-user attempts to masquerade as an IoT device for purposes of (Internet) service stealing and/or privacy breach attacks. For example, the malicious end-user may position their Wi-Fi station (STA) in close proximity to the gateway device of another end-user and masquerade as an IoT device (i.e., broadcast a beacon with an SSID that matches a particular IoT SSID pattern accepted by the gateway device of the other end-user). A gateway device in such a situation may mistake the Wi-Fi STA of the malicious end-user for an IoT device and may provide the Wi-Fi STA (i.e., spoofed IoT device) of the malicious end-user with credentials of the end-user Wi-Fi network; thereby providing access to the Wi-Fi network of the end-user to the malicious end-user. A system in accordance with various aspects of the present disclosure provides multiple solutions to address such issues, which may be applied alone or in combination.

An IoT device in accordance with various aspects of the present invention may support IoT device authentication in several ways. In one example approach, the IoT device may include a "magic (e.g., known to the IoT device and gateway device manufacturer(s) but unlikely to normally occur) number" in the SSID of the beacon broadcast by the IoT device. Such a "magic number" may be used by the gateway device as a means to authenticate the IoT device. In another example, an IoT device may append a checksum to the SSID before broadcast in the beacon when operating in "Soft AP mode", where the checksum is calculated over the SSID and additional known data, like a BSSID of IoT device. The algorithm for such a checksum calculation may be kept private, and only shared with vendors that build IoT devices, or the communication modules for IoT devices.

An IoT device in accordance with various aspects of the present disclosure may include a "vendor-specific attribute" (VSA) in the Wi-Fi beacon transmitted by an IoT device operating in "Soft AP mode." The VSA may include a key-hash message authentication code (HMAC) signature, which may be calculated using, for example, the SSID, BSSID, and other known attributes (i.e., known to the IoT device and the gateway device). Such an HMAC signature approach may be further enhanced by provisioning the gateway device and IoT devices, at the factory, with a long string of random characters that may then be used to extract a random "initialization vector" (IV), which may be used for the calculation of an HMAC signature calculation. An initialization vector may be a fixed-size input to a cryptographic primitive, and is typically a random or pseudorandom value. Parameters such as, for example, the index and/or possibly length of the IV may be communicated through a vendor-specific attribute in a Wi-Fi beacon. The gateway device may then use the information in the vendor-specific attribute(s) to calculate the HMAC signature, and may consider the IoT device to be an authentic IoT device if the received HMAC is validated.

In yet another approach according to aspects of the present disclosure, the gateway device may challenge an IoT device to authenticate itself by providing a nonce (i.e., a string or expression intended for a single use) to the IoT device, which is then used by the IoT device to create an HMAC signature. The calculation of the HMAC signature may be similar to one described in above.

A system according to various aspects of the present disclosure may also employ credentials encryption. Such an approach may encrypt a passphrase that is provided to an IoT device. The key for the encryption may, for example, be a shared key that is provisioned into all IoT devices and into the gateway device, e.g., at the factory. Alternatively, the key for such encryption may be calculated using Key Derivation Functions (KDF) such as those defined in RFC 5869 or ISO-18033-2, using data attributes known to both sides of the exchange such as, for example, BSSIDs of the AP and STA, the SSID of BS, etc. To introduce randomness into key generation, an IV extraction technique similar to one described above may be used. Another technique for introducing randomness may pick a random number of iterations to perform during the key generation stage. The key may then be used to encrypt the passphrase. In accordance with aspects of the present disclosure, the random number and/or the index/length of the IV may be communicated along with the encrypted data, to enable the other side of the exchange to decrypt the passphrase. In various aspects of the present disclosure, the algorithm for key generation and the string used for calculating the IV may be kept secret.

A system in accordance with various aspects of the present disclosure may include intrusion detection features. In spite of taking the precautions of authenticating the IoT device and encrypting the passphrase, it may be possible for a malicious end-user to gain access to the Wi-Fi network of the end-user through the gateway device. For example, this may occur if the algorithm for calculation of the HMAC signature or the KDF falls into the hands of the malicious end-user. A system in accordance with the present disclosure may notify the end-user that an unknown device is connected to their gateway device. This may be done in several ways. In a first example approach, operating in a passive manner; the gateway device may provide the end-user with a list of all IoT devices connected to the gateway device, and the end-user may then identify any device(s) that are not IoT devices of the end-user. In a second example approach, in an intelligent manner; the gateway device may alert the end-user about the existence of connected devices that do not exhibit IoT device behavior. That is, the gateway device may analyze communication activity, and notify the end-user of those I/O devices that do not connect to certain servers, universal resource locators (URLs), universal resource identifiers (URIs), IP addresses, etc., that are normally used by the IoT devices and gateway devices in the system, in accordance with various aspects of the present disclosure.

Figure 2:
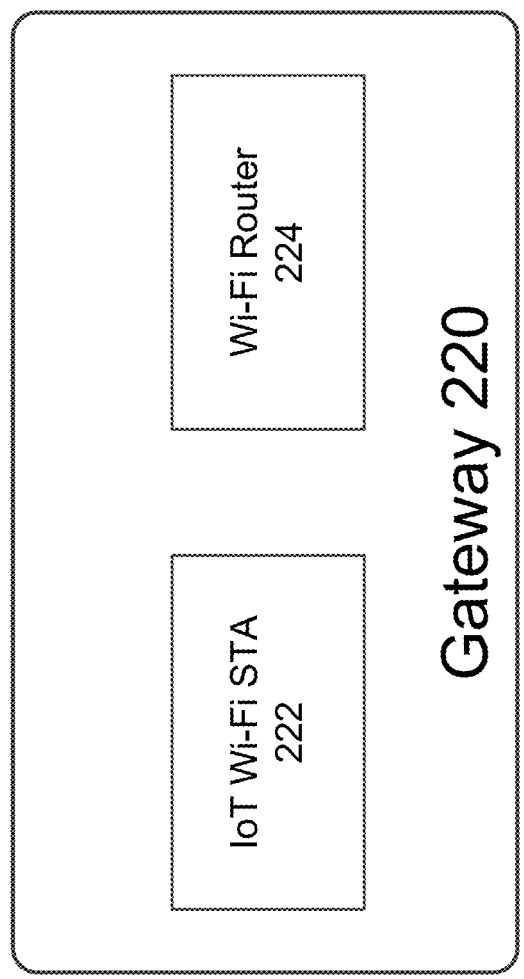
FIG. 2 is a block diagram illustrating an example gateway device 200, in accordance with various aspects of the present disclosure.

FIG. 2 is a block diagram illustrating an example gateway device 220, in accordance with various aspects of the present disclosure. The example gateway device 220 may be considered to include functionality for two primary elements: an IoT Wi-Fi station (STA) 222 and a Wi-Fi-router 224. The Wi-Fi STA 222 functions to connect as an STA to an end-user IoT device (e.g., IoT devices 110, 112, 114, 116 of FIG. 1) when the end-user IoT device is in what may be referred to herein as a "Soft AP mode." When in the "Soft AP mode," the IoT device may behave as a Wi-Fi (e.g., IEEE 802.11 a/b/g/n/ac) "access point," and Wi-Fi STA 222 may provide Wi-Fi credentials (e.g., Service Set Identifier (SSID), Passphrase, Security Mode) to the IoT device, so that the IoT device is then able to associate with the Wi-Fi router 224 of the gateway device 220. The Wi-Fi router 224 of FIG. 2 may, in some aspects of the present disclosure, function as a Wi-Fi Router that may provide wireless Internet connectivity to conventional Wi-Fi STA devices (e.g., Wi-Fi equipped personal computers, tablets, smart phones, and the like) using wireless communication according to, for example, any of IEEE 802.11 a/b/g/n/ac. It should be noted that although FIG. 2 represents the functionality of the gateway device 220 as a stand-alone device having two separate functional units, those aspects do not represent specific limitations of the present disclosure, as the gateway device 220 may be integrated into the functionality of another device or system (e.g., a household appliance (e.g., refrigerator, stove, clothes washer/drier), heating/ventilation/air conditioning system, security system, stereo, television, personal computer, etc.), an office machine (e.g., copier, refrigerator, freezer, microwave, oven), or any other suitable piece of equipment. In addition, the functionality of the Wi-Fi STA 222 and Wi-Fi router 224 may share common elements/functional blocks (e.g., executable code, hardware circuitry, or logic). Further, each component of the gateway device 220 may be a separate network element running on its own hardware, and one or both components may be software components running on a suitable processor.

Figure 3:
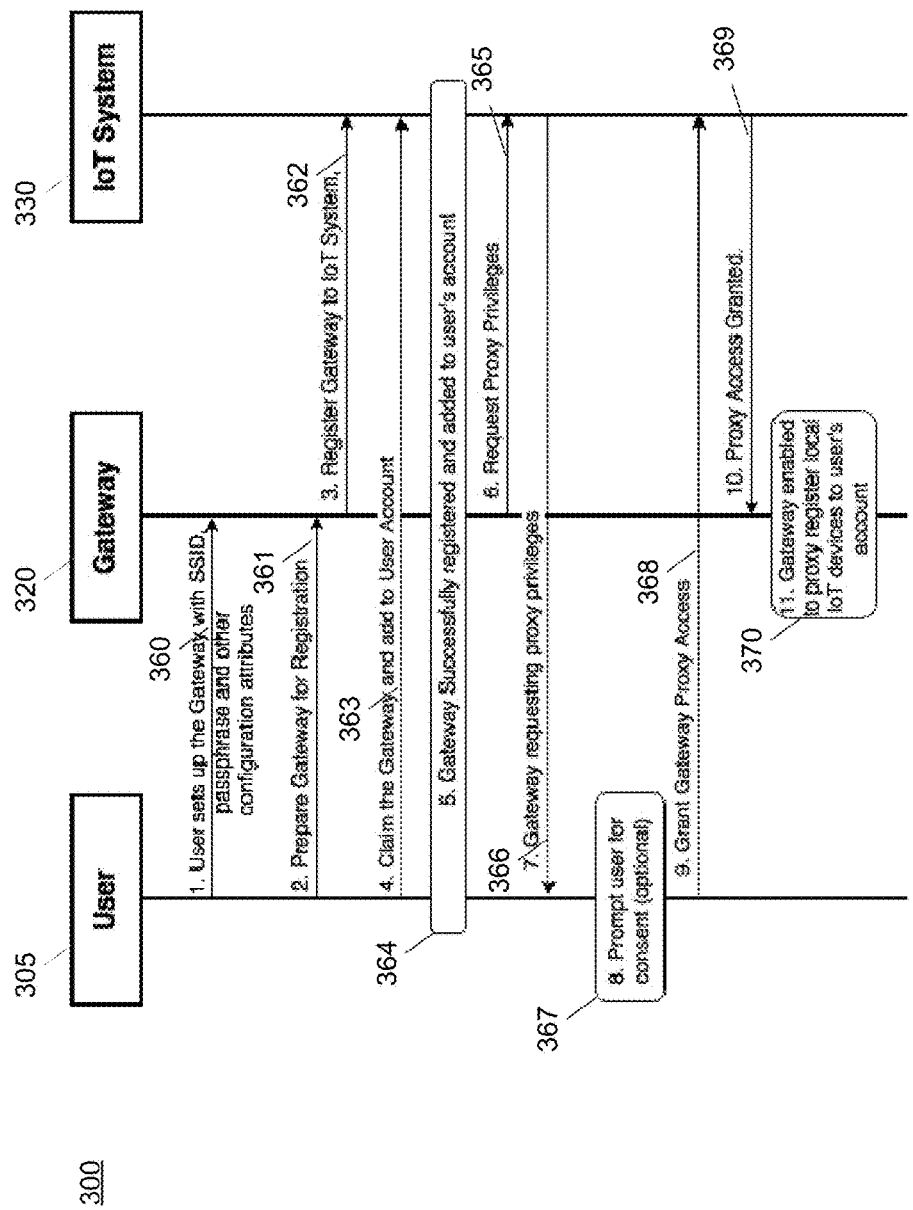
FIG. 3 is an information exchange diagram illustrating an example process of registering a gateway device that may correspond to, for example, the gateway devices of FIG. 1 and FIG. 2, with an IoT system that may correspond to, for example, the IoT system of FIG. 1, in accordance with various aspects of the present disclosure.

FIG. 3 is an information exchange diagram illustrating an example process of registering a gateway device that may correspond to, for example, the gateway devices 120, 220 of FIG. 1 and FIG. 2, with an IoT system that may correspond to, for example, the IoT system 130 of FIG. 1, in accordance with various aspects of the present disclosure. The elements involved in the flow of information shown in FIG. 3 include an end-user 305, a gateway device 320, and an IoT system 330, which may correspond to the end-user 105, gateway device 120, and IoT system 130 of FIG. 1. The process of FIG. 3 begins at information exchange 360, when the end-user provides operating parameters (e.g., SSID, passphrase, and other configuration parameters) to the gateway device (e.g., gateway device 220 of FIG. 2) for use in operating a Wi-Fi network, by provisioning the gateway device with the parameters needed to make the Wi-Fi network function. Next, at message exchange 361, the end-user prepares the gateway device for registration or association with the IoT system 330, by providing any information needed for the registration (e.g., information identifying an account for the end-user 305). Then, at information exchange 362, the gateway device proceeds to register itself with the IoT system 330.

Next, at information exchange 363, the end-user accesses their account on the IoT system 330, provides information needed to claim the newly registered gateway device 320 as belonging to the end-user, and provides whatever end-user inputs needed to add the gateway device 320 to their account on the IoT system 330. The gateway device 320 is then, at 364, successfully registered or associated with the IoT system 330, and added to the account on the IoT system 330 of the end-user 305.

Next, at information exchange 365, the gateway device 320 requests proxy privileges from the IoT system 330. In response to the request of the gateway device 320, the IoT system 330 then, at information exchange 366, sends information to the end-user 305 (e.g., information identifying the gateway device 320 and the end-user account on the IoT system 330), requesting that the end-user 305 authorized proxy privileges for the gateway device 320. At 367, the end-user is prompted to provide the information needed for signaling a grant of proxy privileges, and presumably provides the needed information. Following the end-user grant of the request at 367, the IoT system 330 then, at information exchange 368, receives information granting proxy privileges to the gateway device 320. Next, at information exchange 369, the IoT system 330 indicates to the gateway device 320 that proxy privileges have been granted, and at 370, the gateway device 320 is enabled to register end-user IoT devices with the end-user account on the IoT system 330.

Figure 4:
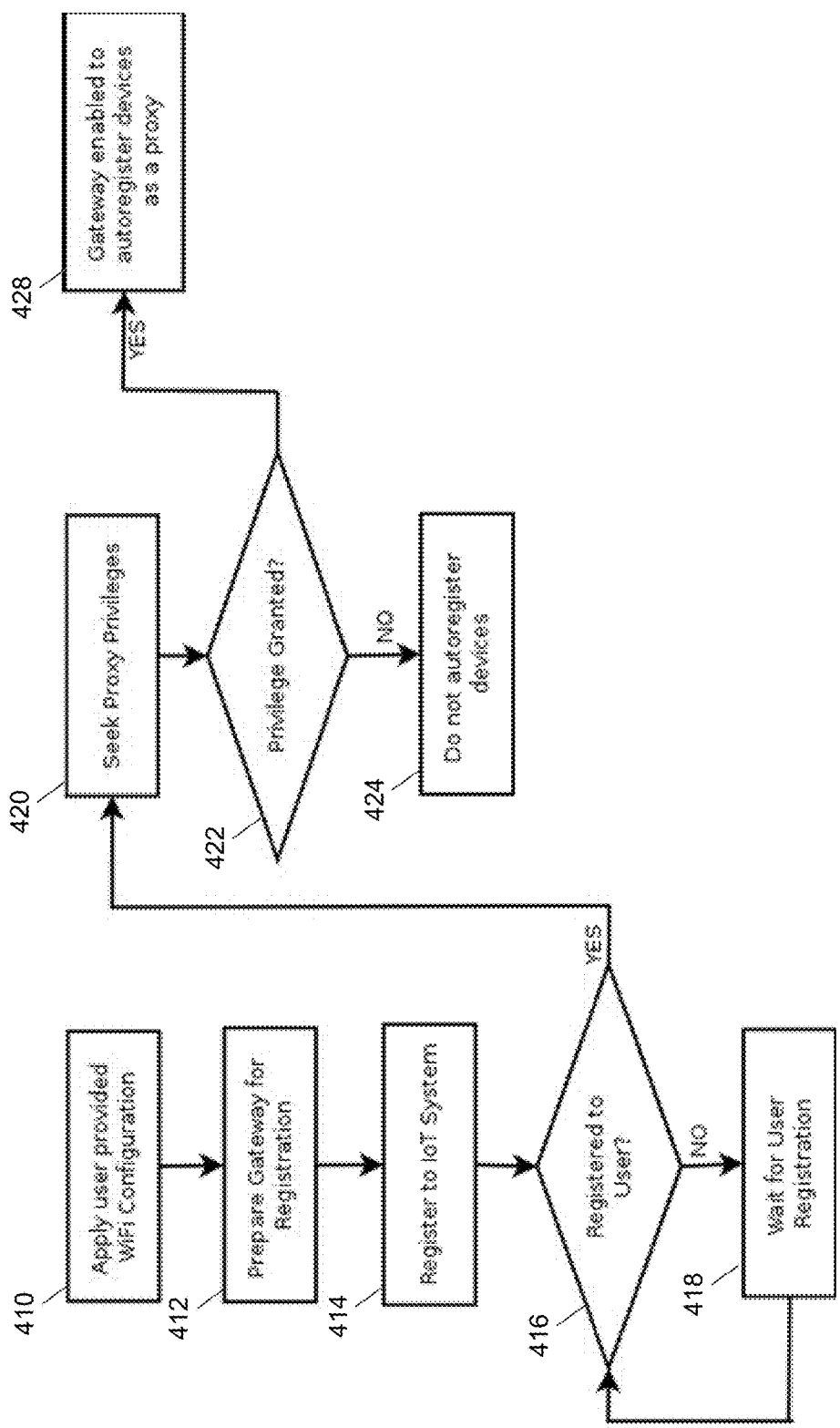
FIG. 4 is a flowchart illustrating an example method of registering a gateway device that may correspond to, for example, the gateway devices of FIG. 1, FIG. 2, and FIG. 3, respectively, with an IoT system that may correspond to, for example, the IoT system of FIG. 1 and FIG. 3, respectively, in accordance with various aspects of the present disclosure.

FIG. 4 is a flowchart illustrating an example method of registering a gateway device that may correspond to, for example, gateway devices 120, 220, 320 of FIG. 1, FIG. 2, and FIG. 3, respectively, with an IoT system that may correspond to, for example, the IoT system 130, 330 of FIG. 1 and FIG. 3, respectively, in accordance with various aspects of the present disclosure. The method of FIG. 4 begins at block 410, where the method instructs a gateway device (e.g., gateway device 120, 320 of FIG. 1 and FIG. 3, respectively) to apply end-user provided operating parameters (e.g., SSID, passphrase, and other configuration parameters) for use in operating a Wi-Fi network. Next, at block 412, the method prepares the gateway device for registration with an IoT system (e.g., IoT system 130, 330 of FIG. 1 and FIG. 3, respectively), by applying any information needed for the registration (e.g., information identifying an end-user account provided by the end-user) to the gateway device. Then, at 414, the method of FIG. 4 directs the gateway device to register itself with the IoT system.

Next, at block 416, the method of FIG. 4 causes the gateway device to determine whether the gateway device is registered to the end-user with the IoT system (e.g., IoT system 130, 330). If the gateway device performing the method determines that it is not registered with the IoT system, the method directs the gateway device to repeat block 416. If, however, the gateway device performing the method of FIG. 4 determines that it is registered with the IoT system, control is then passed to block 420, where the gateway device is directed to seek proxy privileges from the IoT system (e.g., IoT system 130, 330). Next, at block 422, the method determines whether proxy privileges have been granted to the gateway device. If, at block 422, it is determined that proxy privileges were not granted to the gateway device, the method proceeds to block 424, and the gateway device will not automatically register IoT devices. If, however, it is determined at block 422 that proxy privileges were granted to the gateway device, the method proceeds to block 428, where the method enables the gateway device to act as a proxy and automatically register IoT devices with the IoT system.

Figure 5:
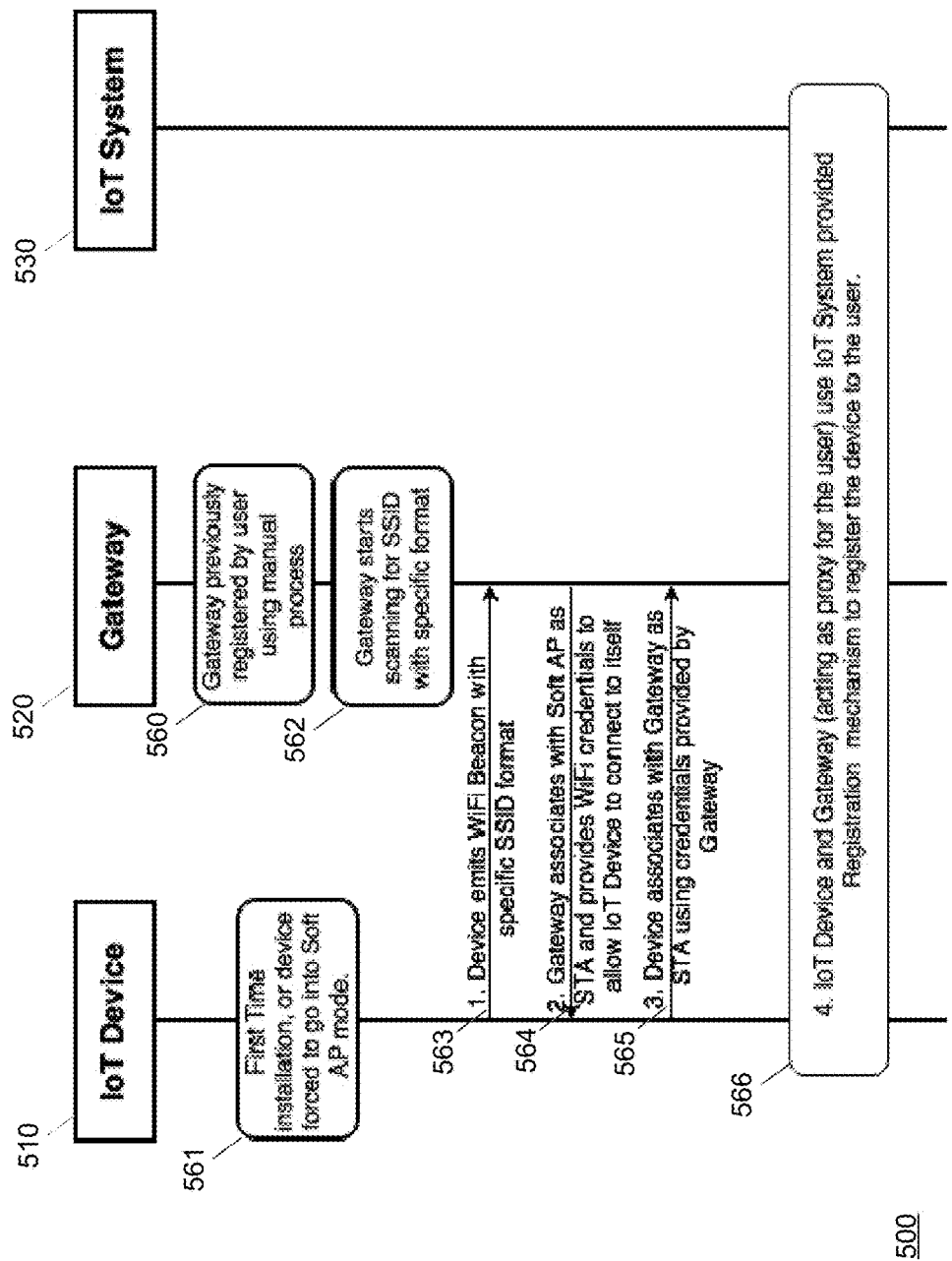
FIG. 5 is an information exchange diagram illustrating an example process for use in a gateway device that may correspond to, for example, the gateway devices of FIG. 1 and FIG. 2, to discover nearby IoT devices that may correspond to, for example, the IoT devices of FIG. 1, in accordance with various aspects of the present disclosure.

FIG. 5 is an information exchange diagram illustrating an example process for use in a gateway device that may correspond to, for example, the gateway devices 120, 220 of FIG. 1 and FIG. 2, to discover nearby IoT devices that may correspond to, for example, the IoT devices 110, 112, 114, 116 of FIG. 1, in accordance with various aspects of the present disclosure. The illustration of FIG. 5 includes an IoT device 510, a gateway device 520, and an IoT system 530 that may correspond to, for example, the any of the IoT devices 110, 112, 114, 116, the gateway devices 120, 220, and the IoT system 130 of FIG. 1, respectively.

Beginning at 560, the gateway device 520 is assumed to be previously registered with an IoT system (e.g., IoT system 130 of FIG. 1) by the end-user (e.g., end-user 105 of FIG. 1) using, for example, a manual process. Following registration of the gateway device with the IoT system, the gateway device may then, at 562, act as an STA (e.g., using Wi-Fi STA 222 of FIG. 2) and begin scanning for a "beacon" transmission having an SSID of a particular format according to various aspects of the present disclosure. The particular format of the SSID information element of the beacon transmission may, for example, include a particular sequence of characters or data bytes that are not likely to be broadcast by APs. At 561, an IoT device (e.g., any of IoT devices 110, 112, 114, 116 of FIG. 1), upon first installation or following manual activation, may enter what may be referred to herein as "Soft AP mode," in which the IoT device behaves as an access point (AP) having certain limited functionality. The term "limited functionality AP" may be used herein to refer to an AP that does not necessarily support the complete functionality of an AP according to the applicable wireless communication (e.g., IEEE) standard or recommendation, e.g., such an AP may not accept incoming communications from all STAs that are in range of the AP signal. In this example, the IoT device may, as shown in information exchange 563 of FIG. 5, transmit a Wi-Fi "beacon" with an SSID field formatted according to the particular format mentioned above.

Next, the gateway device (e.g., 120 of FIG. 1), during scanning for beacon transmissions having the particular SSID format, receives the beacon transmission of the IoT device operating in "Soft AP mode" (e.g., 110, 112, 114, 116 of FIG. 1), and recognizes the particular SSID format of the received beacon transmission. In response to the recognition of the beacon transmission of the particular SSID format, the gateway device may then, at information exchange 564, "associate" with the IoT device that is sending the beacon transmission with the particular SSID format, and may provide Wi-Fi credentials (e.g., SSID, passphrase, etc.) to the IoT device. Later, at information exchange 565, the IoT device may "associate" with the Wi-Fi router functionality of the gateway device (e.g., gateway device 120) using the credential provided by the gateway device. The IoT device and the gateway device in its role as a proxy then, at 566, register the IoT device with the end-user account on the IoT system.

Figure 6:
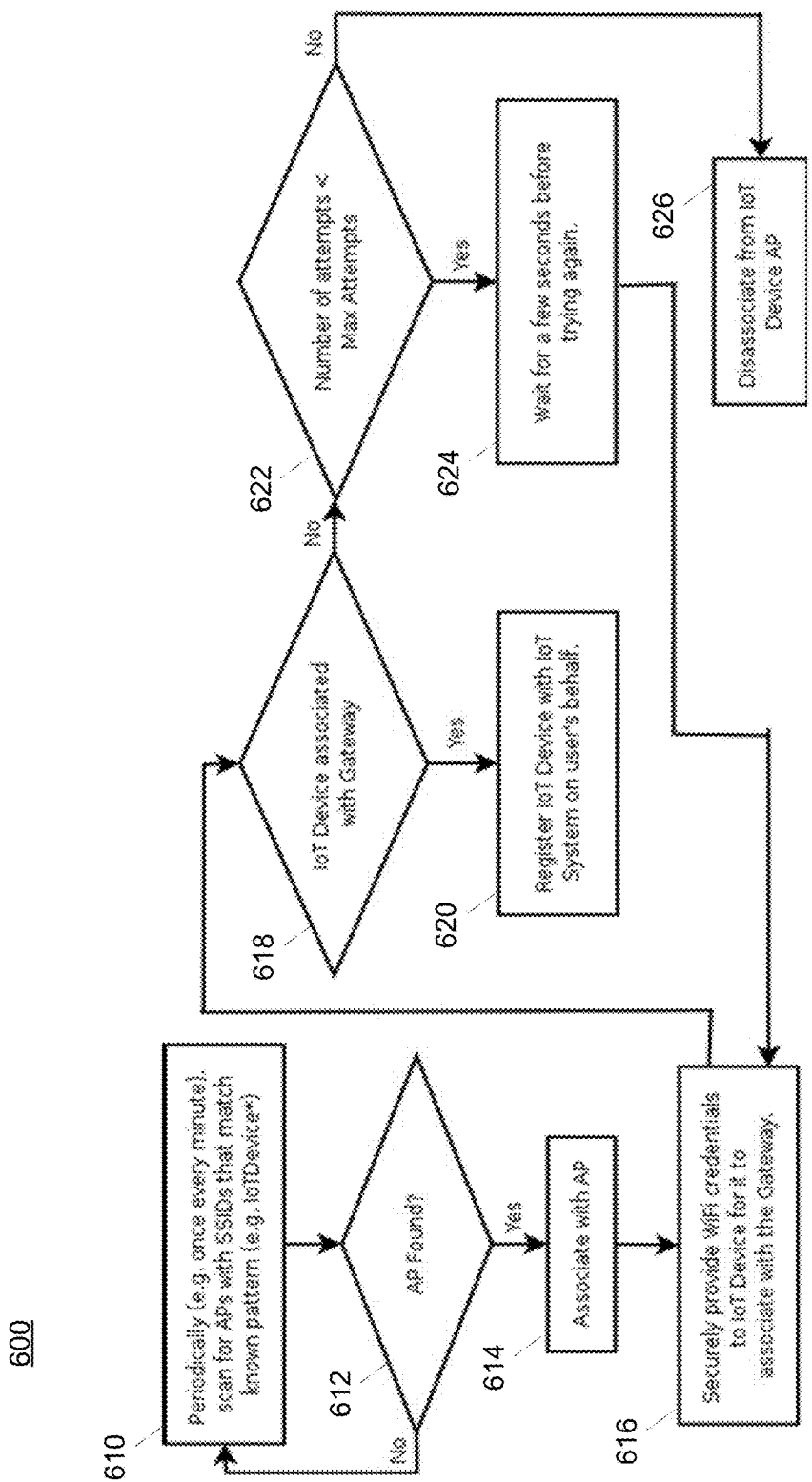
FIG. 6 is a flowchart of an example method of operating a gateway device that may correspond to, for example, the gateway devices of FIGS. 1, 2, and 3, in accordance with various aspects of the present disclosure.

FIG. 6 is a flowchart of an example method of operating a gateway device that may correspond to, for example, the gateway devices 120, 220, 320 of FIGS. 1, 2, and 3, in accordance with various aspects of the present disclosure. The method of FIG. 6 begins at block 610, where the gateway device (e.g., gateway devices 120, 220, 320) periodically (e.g., every N seconds or minutes) scans for APs transmitting a beacon transmission having the particular SSID format described above. As discussed above, an AP transmitting a beacon transmission having an SSID of a particular format may be an IoT device operating in "Soft AP mode," in accordance with various aspects of the present disclosure. If, at block 612, no AP is found that is transmitting a beacon having such an SSID format, the method then returns to block 610, and continues scanning. If, however, an AP is found that is transmitting a beacon having an SSID matching the particular format, the gateway device, at block 614, associates with the AP, which the gateway device has determined to be an IoT device according to aspects of the present disclosure.

Next, at block 616, the gateway device securely transmits Wi-Fi credentials to the IoT device, for later use by the IoT device in associating with the gateway device. Then, at block 618, the IoT device, operating at least in part as a Wi-Fi STA, attempts to associate with the gateway device, which is operating as an AP. If, at block 618, it is determined that the association of the IoT device with the gateway device is successful, the method of FIG. 6 continues at block 620, where the gateway device, acting as a proxy, registers the IoT device with the IoT system, on behalf of the end-user, and the method of FIG. 6 ends. If, however, the gateway device determines that the association of the IoT device with the gateway device was not successful, then the method, at block 622, determines whether the number of association attempts already made is less than the maximum allowed number of attempts. If it is determined that the number of association attempts already made is less than the maximum allowed number of attempts, the gateway device waits for a certain period of time (e.g., a few seconds), and the method returns to block 616 to again attempt to securely transfer Wi-Fi credentials to the IoT device. If, however, it is determined that the number of association attempts already made is not less than the maximum allowed number of attempts, the STA functionality of the gateway device disassociates from the "Soft AP" of the IoT device, and the method of FIG. 6 ends. In accordance with various aspects of the present disclosure, the IoT device may alternately, or concurrently, operate in "Soft AP mode" and "STA mode." If the IoT device does operate in STA and "Soft AP" modes simultaneously, the example method of FIG. 6 for operating a gateway device (e.g., the gateway device 220 of FIG. 2)

may restart at block 616. If the IoT device does not operate in STA and "Soft AP" modes simultaneously, the example method of FIG. 6 may instead restart at block 614.

Figure 7:
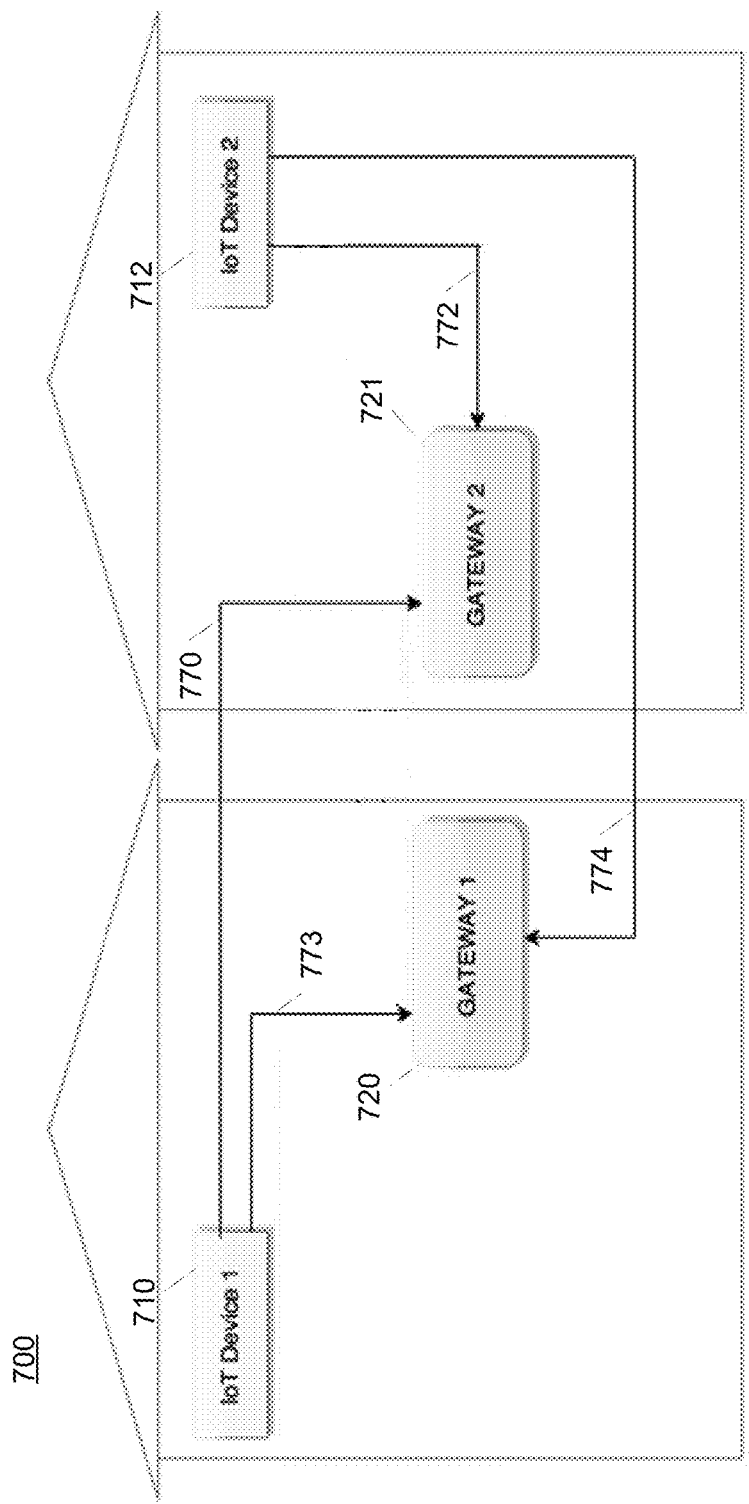
FIG. 7 is an illustration demonstrating the issue of operating IoT devices in proximity to two or more gateway devices, in accordance with various aspects of the present disclosure.

FIG. 7 is an illustration demonstrating the issue of handling IoT devices in proximity to two or more gateway devices, in accordance with various aspects of the present disclosure. The illustration of FIG. 7 shows a first IoT device 710 in a first premise having a first gateway device 720, and a second IoT device 712 in a second premise having a second gateway device 721. In accordance with various aspects of the present disclosure, the first gateway device 720 may provide its Wi-Fi credentials to the first IoT device (and not to the second IoT device), based upon determination that the strength of the signals seen by the first IoT device 710 is strongest from the first gateway device 720. Similarly, the second gateway device 721 may provide its Wi-Fi credentials to the second IoT device 712 and not to the first IoT device 710, based on the determination that the strength of the signals seen by the second IoT device 712 is the strongest from the second gateway device 721. The first IoT device 710 and the second IoT device 712 may report the strengths of the signals seen to each of the first and second gateway devices 720, 721. In accordance with various aspects of the present disclosure, if the signal strength information received by a gateway device such as the first gateway device 720 and second gateway device 721 results in an ambiguity of which IoT device should associate with which gateway device, the gateway device experiencing the ambiguity may seek end-user consent to permit association with the gateway devices visible to and by the IoT devices (e.g., IoT devices 710, 712). In addition, an end-user may configure a gateway device during setup, such as gateway devices 720, 721 of FIG. 7, to require end-user consent before transmitting Wi-Fi credential information or associating with any IoT device.

Figure 8:
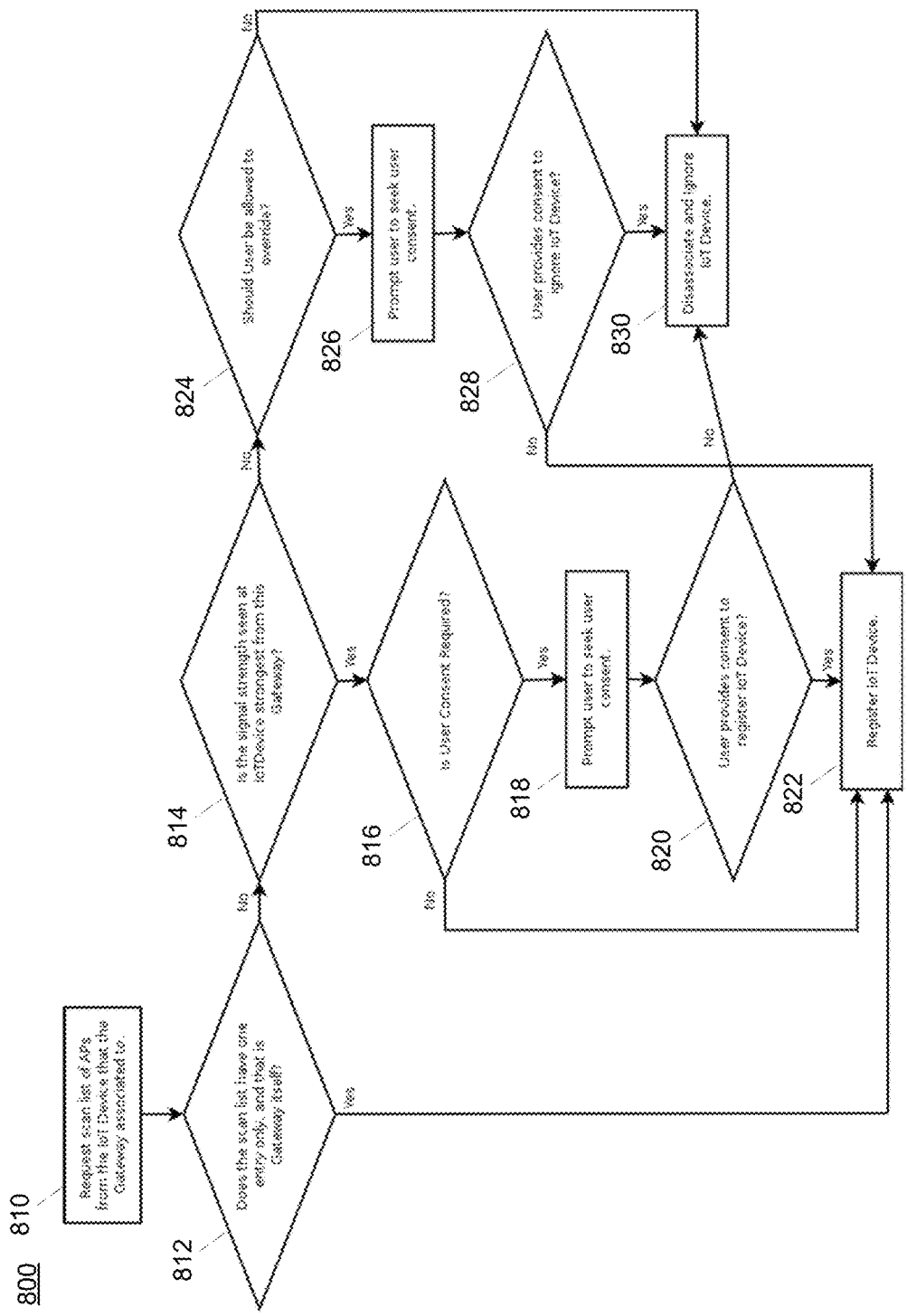
FIG. 8 is a flowchart illustrating an example method of resolving associations of IoT devices and a gateway device such as, for example, the gateway devices of FIG. 1, FIG. 2, FIG. 3, and FIG. 7, in accordance with various aspects of the present disclosure.

FIG. 8 is a flowchart illustrating an example method of resolving associations of IoT devices and a gateway device such as, for example, the gateway devices 120, 220, 320, 520, 721, 722 of FIG. 1, FIG. 2, FIG. 3, and FIG. 7, in accordance with various aspects of the present disclosure. The method of FIG. 8 begins at block 810, where a present gateway device (e.g., gateway devices of FIGS. 1-3, 5, and 7) performing the method, having detected and associated with a particular IoT device (e.g., IoT devices of FIGS. 1-3, 5, and 7) that is transmitting a beacon of the particular format described above, then requests the particular IoT device to transmit to the present gateway device a scan list of APs detected by the particular IoT device. Next, at block 812, the method determines whether the scan list received from the particular IoT device contains information that identifies the only the present gateway device. If the present gateway device determines that the received IoT scan list identifies only the present gateway device, the method then continues at block 822, where the present gateway device acts as a proxy and registers the particular IoT device with the end-user account on an IoT system such as, for example, the IoT system 130 of FIG. 1. If, however, at block 812, the present gateway device determines that the scan list received from the particular IoT device contains information identifying other gateway devices, the method continues at block 814.

At block 814, the method of FIG. 8 determines whether the signal strength seen at the particular IoT device is strongest from the present gateway device. If the signal strength seen at the particular IoT device is strongest from the present gateway device, the method continues at block 816, where a check is made to determine whether end-user consent is required to permit registration of the particular IoT device. If end-user consent is not required, control passes to block 822, where the present gateway device acts as a proxy and registers the particular IoT device with the end-user account on an IoT system such as, for example, the IoT system 130 of FIG. 1. If, however, end-user consent is required, the method proceeds at block 820, where a determination is made of whether the end-user consents to registration. If the end-user does consent to registration of the particular IoT device, the method continues at block 822, described above. If, however, the end-user does not consent to registration of the particular IoT device, control passes to block 830, where the present gateway device dissociates from and ignores further communication from the particular IoT device.

If, at block 814, the strongest signal strength seen at the particular IoT device is not the signal from the present gateway device, the method continues at block 824, where the method determines whether the configuration of the particular gateway device allows the end-user to force the particular gateway device to register the particular IoT. If the end-user is permitted to force the particular gateway device to not register the particular IoT device, the particular gateway device may, at block 826, prompt the end-user for consent from the end-user to ignore the particular IoT device. Then, at block 828, if it is determined that the end-user consented to ignore the particular IoT device, control passes to block 830, described above. If, however, the end-user did not consent to ignore the particular IoT device, control passes to block 822, described above.

Figure 9:
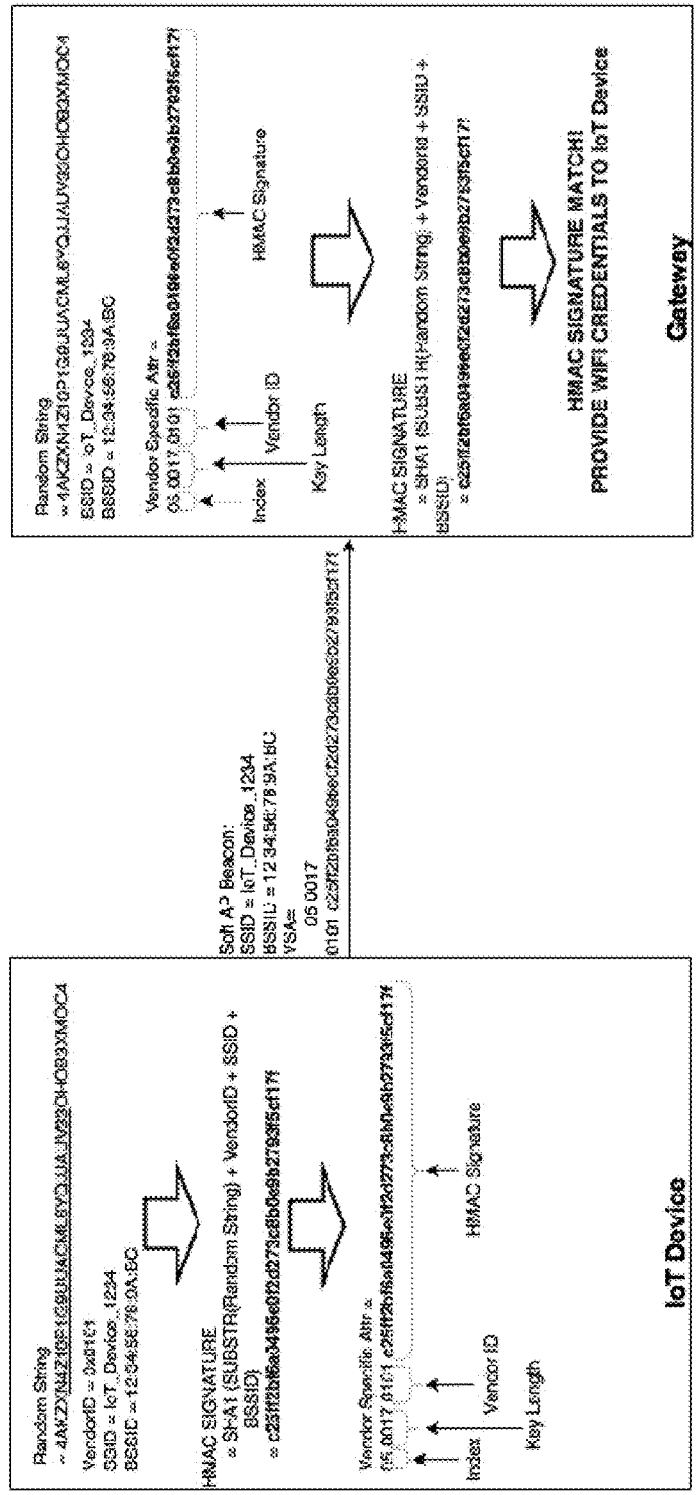
FIG. 9 is a block diagram illustrating an example process of generating and validating information elements of a beacon transmission broadcast by an IoT device attempting to register via a gateway device with an IoT system, in accordance with various aspects of the present disclosure.

FIG. 9 is a block diagram 900 illustrating an example process of generating and validating information elements of a beacon transmission broadcast by an IoT device attempting to register via a gateway device with an IoT system, in accordance with various aspects of the present disclosure. As illustrated in FIG. 9, an IoT device may be initialized at manufacture or post manufacture with a number of parameters including, for example, a shared random string; a vendor identifier, VendorID; an SSID; and Basic Service Set Identifier (BSSID). Upon first use or manual activation, the IoT device to be registered using the proxy registration process of the present disclosure may use the above parameters to generate a key-hash message authentication code (HMAC) signature (e.g., a "security hash"), which may then be assembled, along with, for example, an index parameter, a key length parameter, and the VendorID parameter, into the information elements of what is referred to herein as a "Vendor Specific Attribute" (VSA), which is then sent with the SSID and BSSID in a beacon transmission by the IoT device when operating in the "Soft AP mode" used during IoT device registration, as described above.

The gateway device that receives such a beacon transmission as shown in FIG. 9 and described above, may then use the shared random string, and the SSID, BSSID, index, key length, and VendorID parameters received from the IoT device attempting registration to generate a local copy of the HMAC signature for the IoT device. The locally generated HMAC signature may then be compared with the HMAC signature received from the IoT device in the Vendor Specific Attribute (i.e., index, key length, and VendorID parameters and HMAC signature) portion of the beacon transmission received from the IoT device. If the gateway device determines that the received HMAC signature matches the HMAC signature locally generated, the gateway device of the present disclosure may then provide Wi-Fi credentials to the IoT device attempting to register.

Figure 10:
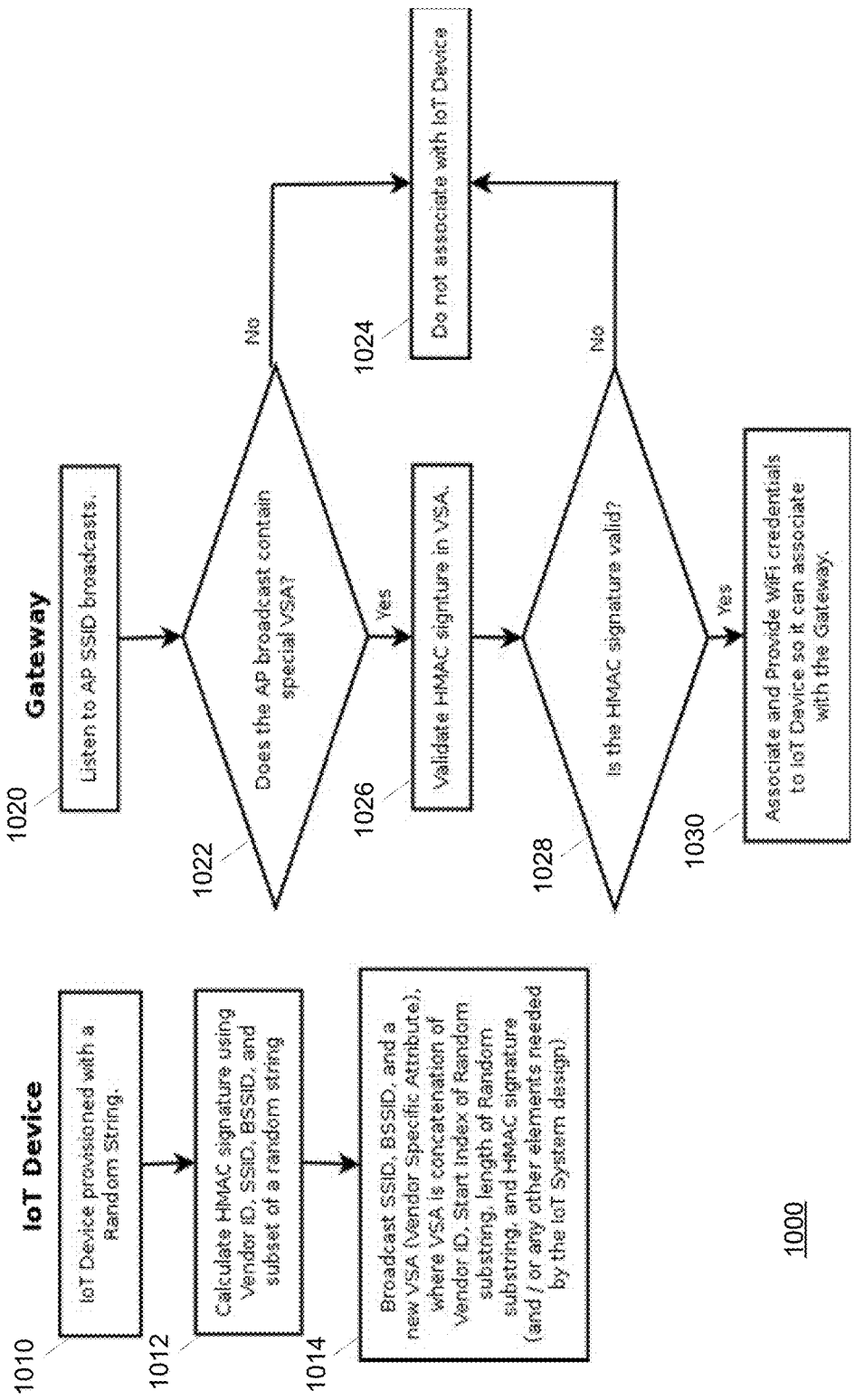
FIG. 10 shows two flowcharts illustrating example interacting processes of an IoT device and a gateway device that together perform actions to securely register the IoT device with the gateway device, in accordance with various aspects of the present disclosure.

FIG. 10 shows two flowcharts illustrating example interacting processes of an IoT device and a gateway device that together perform actions to securely register the IoT device with the gateway device, in accordance with various aspects of the present disclosure. For the gateway device (e.g., gateway device 120 of FIG. 1) of such an arrangement, the example of FIG. 10 begins at block 1020, where the gateway device, once placed into service (e.g., powered up or reset), begins periodically scanning for beacon transmissions of a particular format from IoT devices (e.g., IoT devices 110, 112, 114, 116 of FIG. 1) that are attempting to register with an IoT system (e.g., IoT system 130 of FIG. 1), as described above. The gateway device continues to scan for such beacon transmissions on a regular basis.

For the IoT device, the process of FIG. 10 begins at block 1010, where at some point in time (e.g., during or after manufacture), the IoT device is provisioned with the random string and other parameters discussed above with respect to FIG. 9. The IoT device, at block 1012, is then activated when placed into service (e.g., powered up), or manually activated, to register the IoT device with a gateway device in proximity to the IoT device. The IoT device then, at block 1012, calculates an HMAC signature using a VendorID, SSID, BSSID, and a substring of the random string provisioned into the IoT device, as shown and described above with respect to FIG. 9. The IoT device then, at block 1014, begins to broadcast the SSID, BSSID, and the Vendor Specific Attribute described above, which is assembled from the Vendor ID, a start index of the substring from the random string, the length of the random string, the HMAC signature computed by the IoT device, and/or any other information elements used by the particular implementation of the concepts described herein.

Once the IoT device begins broadcasting the beacon transmission described above, the gateway device (e.g., gateway device 120 of FIG. 1), while scanning for such a beacon transmissions, detects the beacon transmission of the activated IoT device of this example, and the method of the gateway device then proceeds to block 1022, wherein the gateway device performing the method determines whether the beacon transmission broadcast by the IoT device (i.e., in "Soft AP mode") contains a valid VSA, as in the example shown in and described above with respect to FIG. 9. If the gateway device, at block 1022, determines that the received VSA is not valid, the gateway device, at block 1024, does not permit association of the IoT device with the gateway device. However, if the method of FIG. 10 determines at block 1022 that the received VSA is valid, control then passes to block 1026, where the gateway device validates the HMAC signature contained in the received VSA. If, at block 1028, the HMAC signature is determined to be valid, control is then passed to block 1030, and the IoT device is provided with Wi-Fi credentials by the gateway device, to enable the IoT device to associate with the gateway device. If, however, at block 1028, the HMAC signature is determined to be invalid, the method of FIG. 10 performed by the gateway device continues to block 1024, and the gateway device does not permit association of the IoT device with the gateway device.

Figure 11:
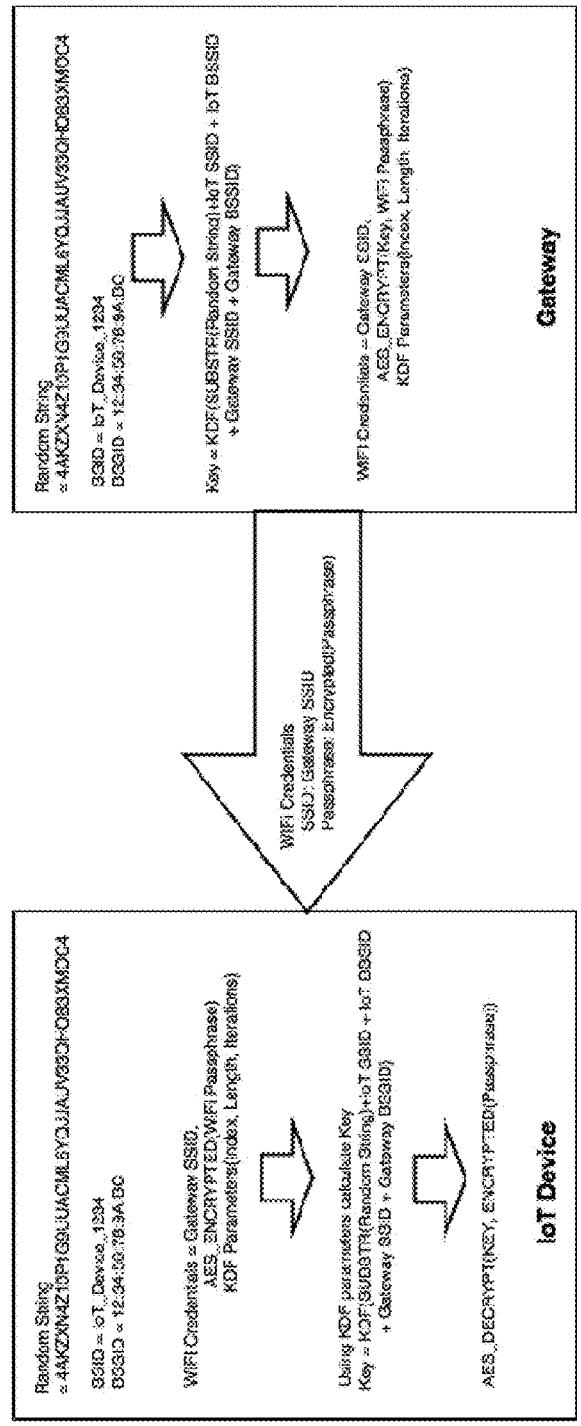
FIG. 11 is a block diagram illustrating an example process of securely transferring Wi-Fi credentials from a gateway device to an IoT device attempting to register via a gateway device with an IoT system, in accordance with various aspects of the present disclosure.

FIG. 11 is a block diagram 1100 illustrating an example process of securely transferring Wi-Fi credentials from a gateway device to an IoT device attempting to register via a gateway device with an IoT system, in accordance with various aspects of the present disclosure. As illustrated in FIG. 11, a gateway device may be initialized at manufacture or post manufacture with a number of parameters including, for example, a random string shared with IoT devices (e.g., at manufacture or later provisioning). In addition, the gateway device may receive from an IoT device seeking to associate with the gateway device, the SSID and BSSID of the IoT device (e.g., via the beacon transmission of the IoT device when operating in "Soft AP mode"). The gateway device may then generate a key according to a Key Derivation Function (KDF), using parameters including, for example, a portion of the random string, the SSID and BSSID of the IoT device, and the SSID and BSSID of the gateway device. The gateway may then assemble the Wi-Fi credentials as a collection of the gateway device SSID, an encryption (e.g., using the Advanced Encryption Standard (AES) or other suitable encryption algorithm) of a Wi-Fi passphrase using a key, and KDF parameters including, for example, an index into the random string, a length of the random string, and a number of iterations of the encryption algorithm. The assembled Wi-Fi credentials are then sent to the IoT device that is attempting to register. Upon receipt by the IoT device, the IoT device may then use the received Wi-Fi credentials including the KDF parameters to derive the key, and then derive the Wi-Fi passphrase using the key and the encrypted passphrase. Access to the gateway device by the IoT device is then realized using the gateway device SSID and the passphrase received or derived from the Wi-Fi credentials receive by the IoT device from the gateway device.

Figure 12:
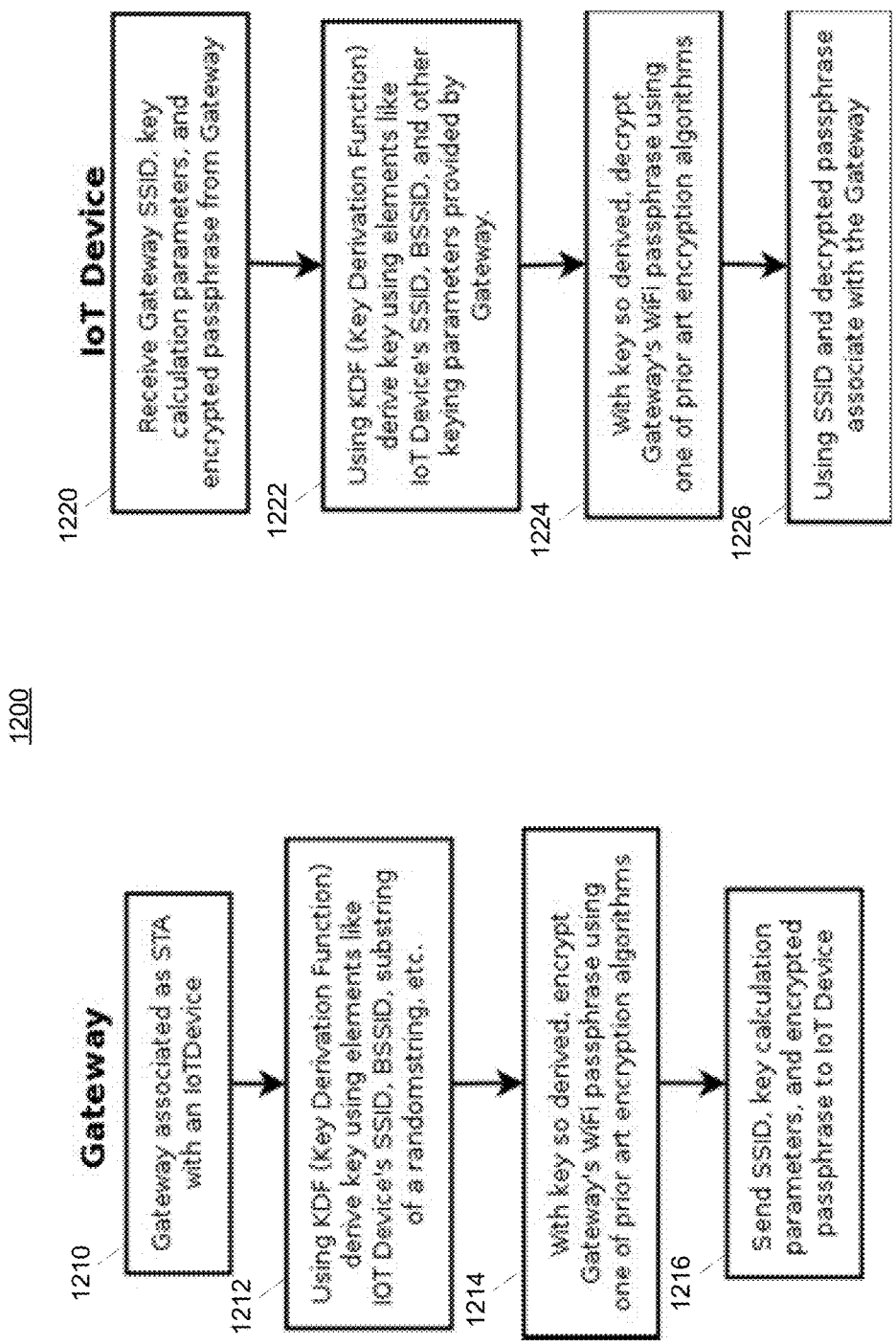
FIG. 12 shows two flowcharts illustrating example interacting processes of a gateway device and an IoT device that together perform actions to securely transfer to the IoT device from the gateway device the Wi-Fi credentials needed by the IoT device to associate with and register via the gateway device, in accordance with various aspects of the present disclosure.

FIG. 12 shows two flowcharts illustrating example interacting processes of a gateway device and an IoT device that together perform actions to securely transfer to the IoT device from the gateway device the Wi-Fi credentials needed by the IoT device to associate with and register via the gateway device, in accordance with various aspects of the present disclosure. For the gateway device (e.g., gateway device 120 of FIG. 1) of such an arrangement, the example of FIG. 12 begins at block 1210, where the gateway device has successfully associated with an IoT device (e.g., IoT devices 110, 112, 114, 116 of FIG. 1) operating in "Soft AP mode" that is attempting to register with an IoT system (e.g., IoT system 130 of FIG. 1), as described above. The gateway device then, at block 1212, derives a key using, for example, a KDF such as that mentioned above and information elements such as, for example, the SSID and BSSID of the IoT device, and a portion of a random string shared by the IoT device and gateway device. The gateway device then, at block 1214, encrypts the Wi-Fi passphrase for the gateway device using an encryption algorithm (e.g., AES) and then, at block 1216, sends the SSID, the parameters used to calculate the key, and the encrypted passphrase to the IoT device.

For the IoT device, the process of FIG. 12 begins at block 1220, where the IoT device (e.g., IoT devices 110, 112, 114, 116 of FIG. 1) receives the SSID of the gateway device, the key calculation parameters, and the encrypted passphrase from the gateway device. Next, at block 1222, the IoT device derives the key using the KDF, the SSID and BSSID of the IoT device, and the same portion of the random string shared by the IoT device and gateway device. Once the key has been derived, the IoT device, at block 1224, may decrypt the passphrase for the gateway device using the encrypt algorithm used to encrypt it. Finally, at block 1226, the IoT device, using the decrypted passphrase of the gateway device and the SSID of the gateway device, associates with and registers with the IoT system (e.g., IoT system 130 of FIG. 1) via the gateway device.

Figure 13:
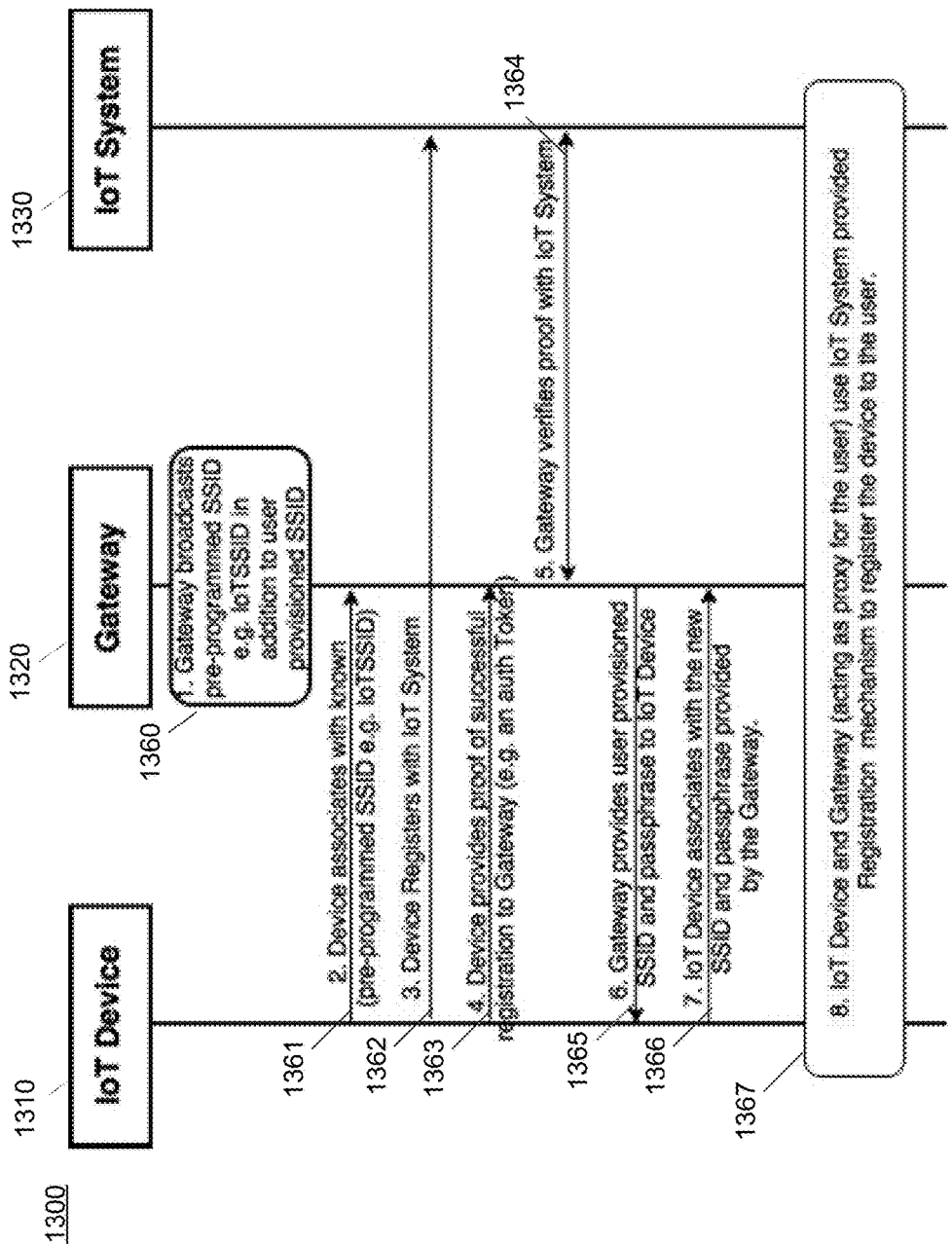
FIG. 13 is an information exchange diagram illustrating an example process for registering an IoT device via a gateway device with an IoT system that may correspond to, for example, any of the IoT devices, the gateway device, and the IoT system of FIG. 1, in which the registration process uses a temporary SSID, in accordance with various aspects of the present disclosure.

FIG. 13 is an information exchange diagram illustrating an example process for registering an IoT device 1310 via a gateway device 1320 with an IoT system 1330 that may correspond to, for example, any of the IoT devices 110, 112, 114, 116, the gateway device 120, and the IoT system 130 of FIG. 1, respectively, in which the registration process uses a temporary SSID, in accordance with various aspects of the present disclosure. The process illustrated in FIG. 13 begins at 1360, where a gateway device (e.g., gateway device 130) is provisioned with two different SSIDs, a first SSID that has a predefined known form and content that may be provisioned into the gateway device at manufacturer or post-manufacture, and an end-user provisioned SSID. At information exchange 1361, an IoT device 1310 may associate with the gateway device 1320 using the SSID of predefined known form and content and may then, at information exchange 1362, register with the IoT system 1330. Upon successfully completing registration with the IoT system 1330, the IoT device 1310 may receive information representing proof of successful registration (e.g., an AUTH token). The IoT device 1320 may then, in information exchange 1363, provide the information representing proof of successful registration (i.e., the AUTH token) to the gateway device 1320. The gateway device 1320 may then, in information exchange 1364, verify the authenticity of the proof of registration provided by the IoT device 1310 with the IoT system 1330. Next, the gateway device 1320 may, at information exchange 1365, provide the end-user provisioned SSID and a passphrase provisioned in or generated by the IoT gateway device 1320, to the IoT device 1310. The IoT device 1310 may then, at information exchange 1366, associate with the gateway device 1320 using the end-user provisioned SSID and the passphrase provided to the IoT device 1310 by the gateway device 1320. At 1367, the IoT device 1310 may then use the gateway device 1320 (acting as a proxy for the end-user) to register the IoT device 1310 with the end-user account on the IoT system 1330.

Note that, for security reasons, the preprogrammed SSID that is provisioned into the gateway device at manufacture or post manufacture may not be broadcast by the gateway device, and may be assigned according to the manufacturer of the gateway device, the manufacturer of IoT devices, or on another basis. Further, the predefined SSID may be changed periodically using an SSID generation algorithm, and the seed to generate such an SSID may be shared with IoT devices as a VSA portion of the end-user provisioned SSID. Additional security enhancements include, for example, the use of a short Dynamic Host Control Protocol (DHCP) lease time by a router functionality of the gateway device (e.g., Wi-Fi router 224 of FIG. 2) for those STAs that associate using the preprogrammed SSID, and ensuring that the DHCP lease for those STAs is never renewed. Additional security capabilities may include, for example, the router functionality of the gateway device (e.g., Wi-Fi router 224 of FIG. 2) stopping acceptance of the preprogrammed SSID upon detection of security threats such as, for example, a single or known group of STAs attempting multiple associations, or too great a number of association attempts using the preprogrammed SSID within a certain period of time. A gateway device in accordance with various aspects of the present disclosure may, for example, include functionality to permit the end-user to receive a report of all attached devices, and allow the end-user to request removal/blocking access of any devices that the end-user does not recognize or to which the end-user does not wish to provide access. The gateway device may also block further access to any IoT devices that have been granted access, but which have not accessed a pre-defined universal resource locator/identifier (URL/URI) within a pre-determined time limit. Further, any one or any combination of the above security enhancements may be included in an implementation in accordance with aspects of the present disclosure.

Figure 14:
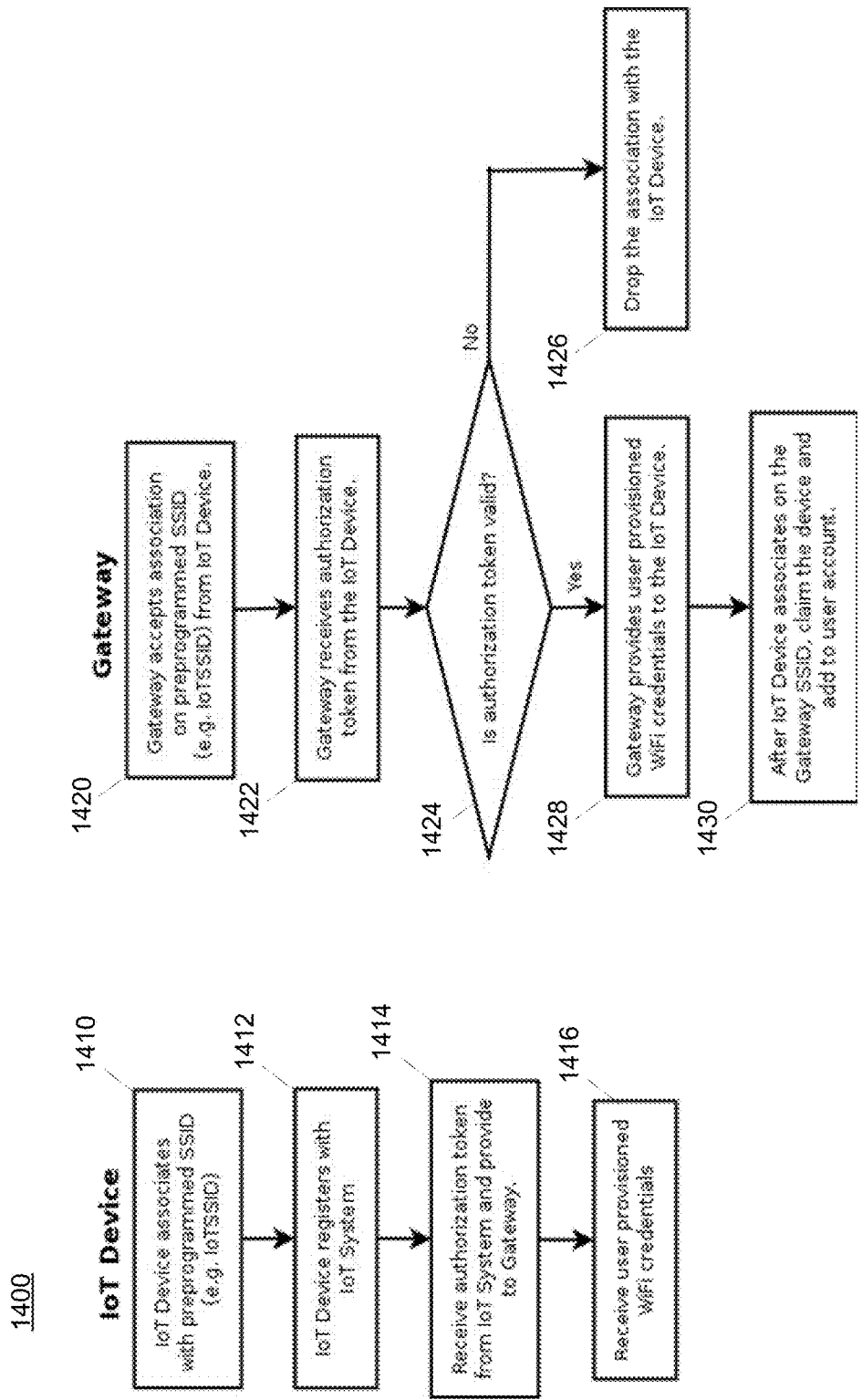
FIG. 14 shows two flowcharts illustrating example interacting processes for registering an IoT device via a gateway device with an IoT system that may correspond to, for example, any of the IoT devices, the gateway device, and the IoT system of FIG. 1, in which the registration process uses a temporary SSID, in accordance with various aspects of the present disclosure.

FIG. 14 shows two flowcharts illustrating example interacting processes for registering an IoT device via a gateway device with an IoT system that may correspond to, for example, any of the IoT devices 110, 112, 114, 116, the gateway device 120, and the IoT system 130 of FIG. 1, respectively, in which the registration process uses a temporary SSID, in accordance with various aspects of the present disclosure. For the IoT device (e.g., IoT device 110 of FIG. 1) of such an arrangement, the example of FIG. 14 begins at block 1410, where the IoT device has been preprogrammed with an SSID of known format and content. The IoT device then, at block 1412, registers with an IoT system (e.g., IoT system 130 of FIG. 1) using the preprogrammed SSID. Once in communication with the IoT system, the IoT device then, at block 1414, receives authorization information (e.g., an AUTH token) from the IoT system, and attempts to associate with the IoT gateway device using the preprogrammed SSID and the authorization information (i.e., AUTH token) provided by the IoT system. The gateway device then, at block 1420, accepts the association attempt by the IoT device, and at block 1422, receives the authorization information (i.e., the AUTH token) from the IoT device. The gateway device then, at block 1424, determines whether the authorization information is valid. If the authorization information is determined to be valid, the method of FIG. 14 continues at block 1428, where the gateway device provides end-user provisioned Wi-Fi credentials to the IoT device, and at block 1430, after the IoT device has associated with the gateway device using the SSID of the gateway device, the gateway device acting as proxy for the end-user claims the IoT device at the IoT system and adds the IoT device to the end-user account on the IoT system. If, however, the authorization information is determined at block 1424 to not be valid, the method of FIG. 14 continues at block 1426, where the gateway device drops the association of the IoT device with the gateway device, and the method of FIG. 14 ends.

The above discussion addresses, in part, what may be referred to herein as "user association." In accordance with various aspects of the present disclosure, "user association" is the process of adding an IoT device to a particular end-user account of an IoT system. A number of different approaches to user association may be employed, in accordance with various aspects of the present disclosure.

In a first approach in accordance with aspects of the present disclosure, a gateway device may act as a proxy that is added to the end-user account on the IoT system, with the involvement of the end-user. The gateway device then seeks proxy privilege from the IoT system and/or the end-user. As a proxy, the gateway device then registers with the IoT system, new IoT devices that the gateway device discovers, using the methods described above or other methods. In this approach, the IoT system is aware of the presence of the gateway device as a network element of the end-user, and works cooperatively with the gateway device to automatically register IoT devices that the gateway device discovers and identifies to the IoT system.

In a second approach in accordance with aspects of the present disclosure, a gateway device may masquerade as the end-user in transactions with the IoT system. The gateway device may discover such new IoT devices, or the end-user may identify such IoT devices to the gateway device. From the perspective of the IoT system, the gateway device is unknown, and the actions of a gateway device employing the second approach appear as though the end-user is performing the registration of an IoT device with the end-user account on the IoT system.

In a third approach in accordance with aspects of the present disclosure, the IoT system may register with the account of an end-user, any IoT devices that have a source IP address that matches a source IP address of other IoT devices registered to the end-user. In this approach, it is assumed that all of the IoT devices of the end-user reside behind a network element (e.g., a router) that performs network address translation (NAT), which may be a normal circumstance in many situations where end-users are connected to the Internet using a cable modem, a digital subscriber line (DSL) modem, a residential gateway, or other device.

Figure 15:
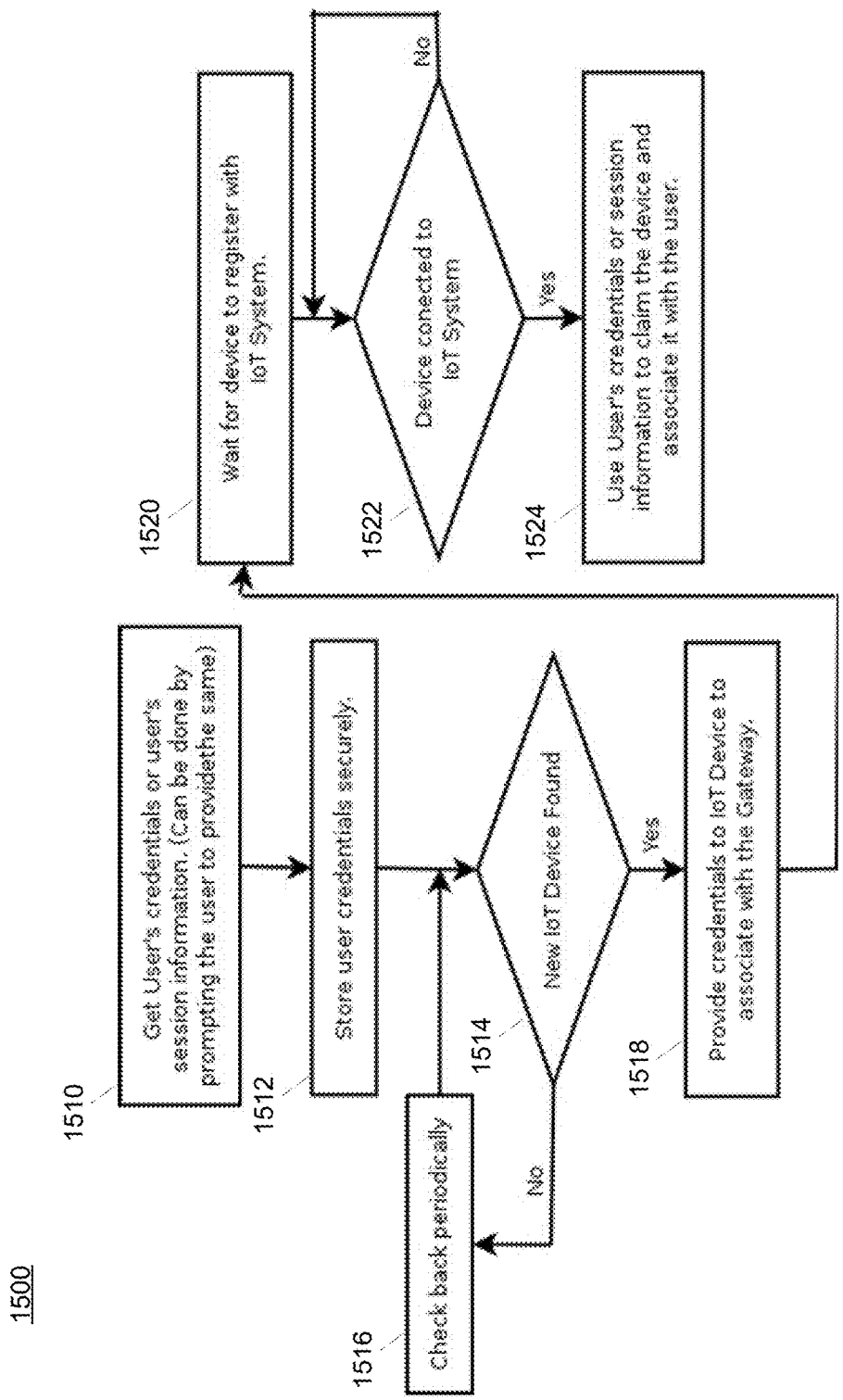
FIG. 15 is a flowchart illustrating an example method of performing end-user association using end-user credentials in a gateway device that may correspond to the gateway device of FIG. 1, in accordance with various aspects of the present disclosure.

FIG. 15 is a flowchart illustrating an example method of performing end-user association using end-user credentials in a gateway device that may correspond to the gateway device 120 of FIG. 1, in accordance with various aspects of the present disclosure. The method of FIG. 15 begins at block 1510, where the gateway device gathers credentials or session information from the end-user. The gateway device may prompt the end-user through the entry of the end-user credentials or session information, using a suitable user interface. The term "session information" may be used herein to refer to information that is used to authorize the user to access services without requiring a full authentication every time. If the user or the client application that the user uses shares such session information with a gateway device (e.g., gateway device 220 of FIG. 2), the gateway device may then use that information to register an IoT device on the user's behalf. Next, at block 1512, the end-user credentials may be stored in a secure storage device of the gateway device, or in a secure remote storage. Then, at block 1514, the method determines whether a new IoT device is present (e.g., connected via a wired or wireless link. If no new IoT device is detected, the method continues at block 1516, where the gateway device simply waits for a certain period of time, and then continues at block 1514 to again check whether new IoT devices are present. If, however, at block 1514, a new IoT device is detected by the gateway device, the method continues at block 1518, where the any credentials necessary to associate with the gateway device as provided to the IoT device. The method of FIG. 15 then, at blocks 1520 and 1522, waits for the new IoT device to register with and connect to an IoT system (e.g., IoT system 130 of FIG. 1). Once registration of the IoT device with the IoT system is completed, the method passes control to block 1524, where the end-user credential are used to claim the new IoT device at the IoT system, and associate the new IoT device with the account of the end-user. It should be noted that the words "register," "associate," and "attach" may be used interchangeably herein.

Figure 16:
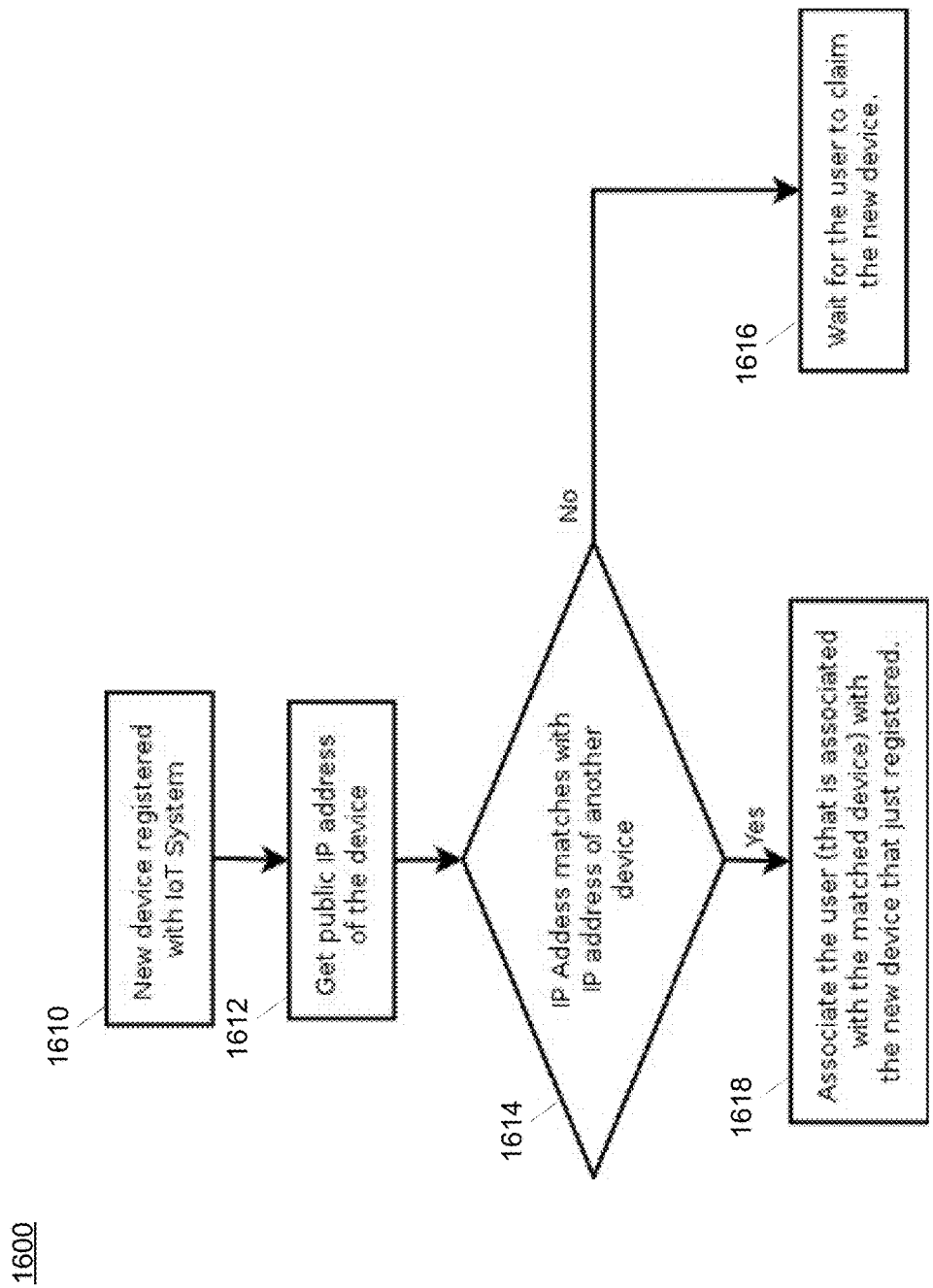
FIG. 16 is a flowchart illustrating an example method of automatic association of new IoT devices with an end-user account at an IoT system, based on an IP address of the IoT device and an IP address of another IoT device previously associated with the end-user at the IoT system, in accordance with various aspects of the present disclosure.

FIG. 16 is a flowchart illustrating an example method of automatic association of new IoT devices with an end-user account at an IoT system, based on an IP address of the IoT device and an IP address of another IoT device previously associated with the end-user at the IoT system, in accordance with various aspects of the present disclosure. The method of FIG. 16 begins at block 1610, where a new IoT device (e.g., IoT device 110 of FIG. 1) is registered with an IoT system (e.g., IoT system 130 of FIG. 1). Next, at block 1612, the IoT system accesses the public IP address of the new IoT device. Then, at block 1614, the IoT system determines whether the public IP address of the new IoT device matches the IP address of another IoT device at the IoT system. If, at block 1614, it is determined that no IoT device has an IP address matching the IP address of the new IoT device, the method continues at block 1616, where the IoT system waits for the end-user to claim the new IoT device and associate it with the account of the end-user. If, however, at block 1614, it is determined that another IoT device has an IP address matching the IP address of the new IoT device, then the method of FIG. 16 continues at block 1618, where the IoT system associates the new IoT device, with the account of the end-user having an IoT device an IP address matching the IP address of the new IoT device.

Various aspects of the present disclosure may be seen in a method for operating a gateway device. Such a method may comprise registering the gateway device to an end user account of an Internet based service using a set of credentials received from the end user; scanning a certain portion of radio frequency spectrum to detect a certain type of transmission; and responsive to the detection of the certain type of transmission, determining whether the certain type of transmission originated from a terminal device of the end-user, by comparing an identifier portion of the certain type of transmission with a predefined data value. The method may also comprise securely sending to the terminal device, one or more parameters that enable wireless access by the terminal device to wireless access point functionality of the gateway device, if it is determined that the certain type of transmission originated from the terminal device of the end-user; and acting as a proxy for the end user by automatically registering the terminal device to the end user account of the Internet based service without additional end user involvement, using the one or more parameters and the set of credentials.

In accordance with various aspects of the present disclosure, the gateway device may be operable to function as a wireless network station and a wireless access point, and the certain type of transmission may comprise a beacon transmission. The beacon transmission may comprise a security hash. The identifier portion may comprise a service set identifier (SSID) information element, and the certain portion of radio frequency spectrum may comprise a license free band. The method may further comprise wirelessly associating with the terminal device upon receiving the one or more parameters from the terminal device. The method may also comprise receiving, from the terminal device, identity information for two or more gateway devices and corresponding signal strength information; and evaluating the received signal strength information for the two or more gateway devices.

Additional aspects of the present disclosure may be found in a non-transitory computer readable medium having a plurality of code sections, where each code section comprises a plurality of instructions executable by one or more processors to cause the one or more processors to perform steps of the method for operating a gateway device, as described above.

Further aspects of the present disclosure may be observed in a system for use in a gateway device, where the system may comprise one or more processors communicatively coupled to an Internet based service and a terminal device of an end user, and in which the one or more processors may be operable to, at least, perform the steps of the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of this disclosure and appended diagrams.

Accordingly, various aspects of the present disclosure may be realized in hardware, software, or a combination of hardware and software. Aspects of the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Various aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various aspects of the present disclosure have been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
in a gateway device configurable to operate as a wireless access point and as a wireless network station:
registering the gateway device to an end user account of an Internet based service using a set of credentials received from the end user;
while the gateway device is operating as a wireless access point, periodically operating as a wireless network station and scanning a certain portion of radio frequency spectrum to detect any beacons transmitted by wireless access points;
responsive to detection of one of said beacons, determining whether the detected beacon originated from a terminal device of the end-user operating as a soft access point, by comparing an identifier portion of the beacon with a predefined data value;
upon determining that the beacon originated from the terminal device of the end-user, operating the gateway device as a wireless network station to enable it to associate with the terminal device operating as a soft access point, and to enable it to securely send to the terminal device, one or more parameters that enable the terminal device to associate with the gateway device while the gateway device is operating as a wireless access point and the terminal device is operating as a wireless network station; and acting as a proxy for the end user by automatically registering the terminal device to the end user account of the Internet based service without additional end user involvement, using the one or more parameters and the set of credentials.

2. The method according to claim 1, wherein the gateway device is operable to function as the wireless network station and the wireless access point in accordance with the IEEE 802.11 family of standards.

3. The method according to claim 1, wherein the determining whether the beacon originated from the terminal device of the end-user comprises determining whether the beacon comprises a service set identifier (SSID) containing an alphanumeric value associated, in memory of the gateway device, with terminal devices that support a soft access point mode.

4. The method according to claim 1, wherein the determining whether the beacon originated from the terminal device of the end-user operating as a soft access point comprises calculating a security hash.

5. The method according to claim 4, wherein the security hash is based, at least in part, on a service set identifier (SSID) information element of the beacon.

6. The method according to claim 1, wherein the certain portion of radio frequency spectrum comprises a license free band.

7. The method according to claim 1, further comprising:
while operating as the wireless access point, wirelessly associating with the terminal device upon receiving the one or more parameters from the terminal device.

8. The method according to claim 7, further comprising:
receiving, from the terminal device, identity information for two or more gateway devices and corresponding signal strength information; and
evaluating the received signal strength information for the two or more gateway devices.

9. A non-transitory computer readable medium having stored thereon a plurality of code sections, each code section comprising a plurality of instructions executable by one or more processors to cause the one or more processors to perform steps of a method for operating a gateway device, the steps comprising:
in a gateway device configurable to operate as a wireless access point and as a wireless network station:
registering the gateway device to an end user account of an Internet based service using a set of credentials received from the end user;
while the gateway device is operating as a wireless access point, periodically operating as a wireless network station and scanning a certain portion of radio frequency spectrum to detect any beacons transmitted by wireless access points;
responsive to detection of one of said beacons, determining whether the detected beacon originated from a terminal device of the end-user operating as a soft access point, by comparing an identifier portion of the beacon with a predefined data value;
upon determining that the beacon originated from the terminal device of the end-user, operating the gateway device as a wireless network station to enable it to associate with the terminal device operating as a soft access point, and to enable it securely send to the terminal device, one or more parameters that enable the terminal device to associate with the gateway device while the gateway device is operating as a wireless access point and the terminal device is operating as a wireless network station; and acting as a proxy for the end user by automatically registering the terminal device to the end user account of the Internet based service without additional end user involvement, using the one or more parameters and the set of credentials.

10. The non-transitory computer readable medium according to claim 9, wherein the gateway device is operable to function as the wireless network station and the wireless access point in accordance with the IEEE 802.11 family of standards.

11. The non-transitory computer readable medium according to claim 9, wherein the determining whether the beacon originated from the terminal device of the end-user operating as a soft access point comprises determining whether the beacon comprises a service set identifier (SSID) containing an alphanumeric value associated, in memory of the gateway device, with terminal devices that support a soft access point mode.

12. The non-transitory computer readable medium according to claim 11, wherein the determining whether the beacon originated from the terminal device of the end-user comprises calculating a security hash.

13. The non-transitory computer readable medium according to claim 9, wherein the security hash is based, at least in part, on a service set identifier (SSID) information element in the beacon.

14. The non-transitory computer readable medium according to claim 9, wherein the certain portion of radio frequency spectrum comprises a license free band.

15. The non-transitory computer readable medium according to claim 9, further comprising:
while operating as the wireless access point, wirelessly associating with the terminal device upon receiving the one or more parameters from the terminal device.

16. The non-transitory computer readable medium according to claim 15, further comprising:
receiving, from the terminal device, identity information for two or more gateway devices and corresponding signal strength information; and
evaluating the received signal strength information for the two or more gateway devices.

17. A system comprising:
a gateway device that comprises circuitry configured to operate as a wireless access point and as a wireless network station, and that is operable to, at least:
1. register itself to an end user account of an Internet based service using a set of credentials received from the end user;
2. while the gateway device is operating as a wireless access point, periodically operate as a wireless network station and scan a certain portion of radio frequency spectrum to detect any beacons transmitted by wireless access points;
3. responsive to detection of one of said beacons, determine whether the detected beacon originated from a terminal device of the end-user operating as a soft access point, by comparison of an identifier portion of the beacon with a predefined data value;
4. upon a determination that the beacon originated from the terminal device of the end-user, operate the gateway device as a wireless network station to enable it to associate with the terminal device operating as a soft access point, and to enable it to securely send to the terminal device, one or more parameters that enable the terminal device to associate with the gateway device while the gateway device is operating as a wireless access point and the terminal device is operating as a wireless network station; and
5. act as a proxy for the end user to perform automatic registration of the terminal device to the end user account of the Internet based service without additional end user involvement, using the one or more parameters and the set of credentials.

18. The system according to claim 17, wherein the gateway device is operable to function as the wireless network station and the wireless access point in accordance with the IEEE 802.11 family of standards.

19. The system according to claim 17, wherein the determination of whether the beacon originated from the terminal device of the end-user operating as a soft access point comprises a determination of whether the beacon comprises a service set identifier (SSID) containing an alphanumeric value associated, in memory of the gateway device, with terminal devices that support a soft access point mode.

20. The system according to claim 19, wherein the determination of whether the beacon originated from the terminal device of the end-user comprises calculation of a security hash.

21. The system according to claim 20, wherein the security hash is based, at least in part, on a service set identifier (SSID) information element of the beacon.

22. The system according to claim 17, wherein the certain portion of radio frequency spectrum comprises a license free band.

23. The system according to claim 17, wherein the gateway device is operable to:
while operating as a wireless access point, wirelessly associate with the terminal device upon reception of the one or more parameters from the terminal device.

24. The system according to claim 23, wherein the gateway device is operable to:
receive, from the terminal device, identity information for two or more gateway devices and corresponding signal strength information; and
evaluate the received signal strength information for the two or more gateway devices.

* * * * *